US012266209B1

(12) United States Patent
Bryslawskyj et al.

(10) Patent No.: US 12,266,209 B1
(45) Date of Patent: Apr. 1, 2025

(54) IMAGE CLASSIFIER AUTOMATED TESTING AND OUTLIER DETECTION

(71) Applicant: Netskope, Inc., Santa Clara, CA (US)

(72) Inventors: Jason B. Bryslawskyj, San Diego, CA (US); Yi Zhang, Santa Clara, CA (US); Emanoel Daryoush, San Jose, CA (US); Ari Azarafrooz, Rancho Santa Margarita, CA (US); Wayne Xin, Santa Clara, CA (US); Yihua Liao, Palo Alto, CA (US); Niranjan Koduri, Pleasanton, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/587,267

(22) Filed: Feb. 26, 2024

(51) Int. Cl.
*G06V 20/70* (2022.01)
*G06V 10/762* (2022.01)
*G06V 40/12* (2022.01)

(52) U.S. Cl.
CPC ........ *G06V 40/1365* (2022.01); *G06V 10/762* (2022.01); *G06V 20/70* (2022.01); *G06V 40/1347* (2022.01)

(58) Field of Classification Search
CPC ...... G06F 18/214; G06F 18/217; G06F 18/24; G06F 18/23; G06F 18/2155; G06F 18/2413; G06N 3/08; G06N 20/00; G06N 20/20; G06T 2207/20081; G06T 2207/20084; G06V 20/70; G06V 40/1365; G06V 40/172; G06V 40/1347
See application file for complete search history.

(56) References Cited

U.S. PATENT DOCUMENTS

| 5,440,723 A | 8/1995 | Arnold et al. |
| 6,513,122 B1 | 1/2003 | Magdych et al. |
| 6,622,248 B1 | 9/2003 | Hirai |

(Continued)

FOREIGN PATENT DOCUMENTS

EP    1063833 A2    12/2000

OTHER PUBLICATIONS

Chen et al., "A Simple Framework for Contrastive Learning of Visual Representations," Proceedings of the 37th International Conference on Machine Learning, Vienna, Austria, PMLR 119, Jul. 2020, 20 pages.

(Continued)

*Primary Examiner* — Andrew M Moyer
*Assistant Examiner* — Ahmed A Nasher

(57) ABSTRACT

A system to generate an image classifier and test it nearly instantaneously is described herein. Image embeddings generated by an image fingerprinting model are indexed and an associated approximate nearest neighbors (ANN) model is generated. The embeddings in the index are clustered and the clusters are labeled. Users can provide just a few images to add to the index as a labeled cluster. The ANN model is trained to receive an image embedding as input and return a score and label of the most similar identified embedding. The label may be applied if the score exceeds a threshold value. The image classifier can be tested efficiently using Leave One Out Cross Validation ("LOOCV") to provide near-instantaneous quality indications of the image classifier to the user. Near-instantaneous indications of outliers in the provided images can also be provided to the user using a distance to the centroid calculation.

20 Claims, 18 Drawing Sheets

(56) References Cited

U.S. PATENT DOCUMENTS

| | | |
|---|---|---|
| 7,080,408 B1 | 7/2006 | Pak et al. |
| 7,298,864 B2 | 11/2007 | Jones |
| 7,376,719 B1 | 5/2008 | Shafer et al. |
| 7,735,116 B1 | 6/2010 | Gauvin |
| 7,966,654 B2 | 6/2011 | Crawford |
| 8,000,329 B2 | 8/2011 | Fendick et al. |
| 8,296,178 B2 | 10/2012 | Hudis et al. |
| 8,793,151 B2 | 7/2014 | DelZoppo et al. |
| 8,839,417 B1 | 9/2014 | Jordan |
| 9,197,601 B2 | 11/2015 | Pasdar |
| 9,225,734 B1 | 12/2015 | Hastings |
| 9,231,968 B2 | 1/2016 | Fang et al. |
| 9,280,678 B2 | 3/2016 | Redberg |
| 9,811,662 B2 | 11/2017 | Sharpe et al. |
| 10,025,950 B1 | 7/2018 | Avasarala et al. |
| 10,084,825 B1 | 9/2018 | Xu |
| 10,237,282 B2 | 3/2019 | Nelson et al. |
| 10,334,442 B2 | 6/2019 | Vaughn et al. |
| 10,382,468 B2 | 8/2019 | Dods |
| 10,484,334 B1 | 11/2019 | Lee et al. |
| 10,826,941 B2 | 11/2020 | Jain et al. |
| 10,832,062 B1 | 11/2020 | Evans et al. |
| 11,030,726 B1 | 6/2021 | Minor |
| 11,032,301 B2 | 6/2021 | Mandrychenko et al. |
| 11,036,856 B2 | 6/2021 | Graun et al. |
| 11,200,454 B1* | 12/2021 | Qian .................. G06V 10/776 |
| 11,281,775 B2 | 3/2022 | Burdett et al. |
| 11,676,298 B1 | 6/2023 | Portail et al. |
| 11,687,841 B2* | 6/2023 | Hagen ................ G06V 10/7747 |
| | | 382/159 |
| 2002/0099666 A1 | 7/2002 | Dryer et al. |
| 2003/0055994 A1 | 3/2003 | Herrmann et al. |
| 2003/0063321 A1 | 4/2003 | Inoue et al. |
| 2003/0172292 A1 | 9/2003 | Judge |
| 2003/0204632 A1 | 10/2003 | Willebeek-LeMair et al. |
| 2004/0015719 A1 | 1/2004 | Lee et al. |
| 2005/0010593 A1 | 1/2005 | Fellenstein et al. |
| 2005/0271246 A1 | 12/2005 | Sharma et al. |
| 2006/0156401 A1 | 7/2006 | Newstadt et al. |
| 2006/0251338 A1 | 11/2006 | Gokturk et al. |
| 2007/0204018 A1 | 8/2007 | Chandra et al. |
| 2007/0237147 A1 | 10/2007 | Quinn et al. |
| 2008/0069480 A1 | 3/2008 | Aarabi et al. |
| 2008/0134332 A1 | 6/2008 | Keohane et al. |
| 2008/0144943 A1 | 6/2008 | Gokturk et al. |
| 2009/0144818 A1 | 6/2009 | Kumar et al. |
| 2009/0249470 A1 | 10/2009 | Litvin et al. |
| 2009/0300351 A1 | 12/2009 | Lei et al. |
| 2010/0017436 A1 | 1/2010 | Wolge |
| 2010/0066822 A1 | 3/2010 | Steinberg et al. |
| 2011/0119481 A1 | 5/2011 | Auradkar et al. |
| 2011/0145594 A1 | 6/2011 | Jho et al. |
| 2012/0278896 A1 | 11/2012 | Fang et al. |
| 2013/0159694 A1 | 6/2013 | Chiueh et al. |
| 2013/0298190 A1 | 11/2013 | Sikka et al. |
| 2013/0347085 A1 | 12/2013 | Hawthorn et al. |
| 2014/0007184 A1 | 1/2014 | Porras |
| 2014/0013112 A1 | 1/2014 | Cidon et al. |
| 2014/0029839 A1 | 1/2014 | Mensink et al. |
| 2014/0068030 A1 | 3/2014 | Chambers et al. |
| 2014/0068705 A1 | 3/2014 | Chambers et al. |
| 2014/0259093 A1 | 9/2014 | Narayanaswamy et al. |
| 2014/0282843 A1 | 9/2014 | Buruganahalli et al. |
| 2014/0359282 A1 | 12/2014 | Shikfa et al. |
| 2014/0366079 A1 | 12/2014 | Pasdar |
| 2015/0100357 A1 | 4/2015 | Seese et al. |
| 2015/0254532 A1 | 9/2015 | Talathi et al. |
| 2016/0323318 A1 | 11/2016 | Terrill et al. |
| 2016/0350145 A1 | 12/2016 | Botzer et al. |
| 2017/0064005 A1 | 3/2017 | Lee |
| 2017/0093917 A1 | 3/2017 | Chandra et al. |
| 2017/0250951 A1 | 8/2017 | Wang et al. |
| 2018/0053042 A1* | 2/2018 | Philbin .................. G06N 3/084 |
| 2019/0095464 A1 | 3/2019 | Xie et al. |
| 2020/0050686 A1 | 2/2020 | Kamalapuram et al. |
| 2020/0311616 A1 | 10/2020 | Rajkumar et al. |
| 2020/0336802 A1 | 10/2020 | Russell et al. |
| 2021/0141896 A1 | 5/2021 | Streit |
| 2021/0209207 A1 | 7/2021 | Lee |
| 2021/0358164 A1 | 11/2021 | Liu et al. |
| 2021/0382937 A1 | 12/2021 | Jie et al. |
| 2022/0027758 A1* | 1/2022 | Kreshpa ................ G06F 1/3206 |
| 2022/0083445 A1* | 3/2022 | Nyati .................... G06F 11/302 |
| 2022/0138439 A1* | 5/2022 | Tambi .................. G06F 40/117 |
| | | 704/2 |
| 2022/0215205 A1 | 7/2022 | Swaminathan et al. |
| 2022/0318229 A1 | 10/2022 | Shreve et al. |
| 2022/0318354 A1 | 10/2022 | Park et al. |
| 2022/0327189 A1 | 10/2022 | Belli et al. |
| 2022/0383037 A1 | 12/2022 | Pham et al. |
| 2022/0398348 A1 | 12/2022 | Voloshynovskiy et al. |
| 2023/0177816 A1 | 6/2023 | Li et al. |
| 2023/0222762 A1 | 7/2023 | Andriushchenko et al. |
| 2023/0222841 A1 | 7/2023 | Chen et al. |
| 2023/0350880 A1* | 11/2023 | Shreve ................ G06F 16/2379 |
| 2024/0177838 A1* | 5/2024 | Liu ........................ G16H 50/70 |

OTHER PUBLICATIONS

Final Office Action in U.S. Appl. No. 18/451,010, mailed Apr. 17, 2024, 25 pages.

Non-Final Office Action in U.S. Appl. No. 18/450,999, mailed Sep. 28, 2023, 17 pages.

Non-Final Office Action in U.S. Appl. No. 18/451,010, mailed Dec. 8, 2023, 20 pages.

Non-Final Office Action in U.S. Appl. No. 18/451,014, mailed Dec. 8, 2023, 17 pages.

Notice of Allowance in U.S. Appl. No. 18/450,999, mailed Jan. 19, 2024, 8 pages.

Tan et al., "EfficientNet: Rethinking Model Scaling for Convolutional Neural Networks," Proceedings of the 36th International Conference on Machine Learning, Long Beach, California, PMLR 97, Sep. 2020, 11 pages.

Yang et al., "Progressive Open Space Expansion for Open-Set Model Attribution." arXiv preprint arXiv:2303.06877. Mar. 2023, 16 pages.

Yu, Ning. "Human-Centric Deep Generative Models: The Blessing and the Curse." Dissertation. University of Maryland, College Park, 2021, 191 pages.

U.S. Appl. No. 18/451,010 Advisory Action dated Jul. 2, 2024, 4 pages.

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

Huckaby, Jeff "Ending Clear Text Protocols," Rackaid.com, Dec. 9, 2008, 3 pgs.

Newton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al., "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.

(56) References Cited

OTHER PUBLICATIONS

Zetter, Kim, "Revealed: The Internet's Biggest Security Hole," Wired, Aug. 26, 2008, 13 pgs.

Adya et al., "Farsite: Federated, available, and reliable storage for an incompletely trusted environment," SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~: text=mode of communication.-, What are the different email protocols%3F, and also has defined functions.

Niit, Special Edition Using Storage Area Networks, Que, 2002, 6 pgs.

Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits? Offer=abt_pubpro_AI-Insider.

Fortinet, FortiGate—3600 User Manual (vol. 1, Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

Fortinet, FortiOS—Administration Guide, (Versions 6.4.0), Jun. 3, 2021, 1638 pgs.

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.

Lee et al., "A Data Mining Framework for Building Intrusion Detection Models," Columbia University, n.d. 13 pgs.

Merriam-Webster Dictionary, 2004, 5 pgs.

Microsoft Computer Dictionary, (5th Ed.), Microsoft Press, 2002, 8 pgs.

Microsoft Computer Dictionary, (4th Ed.), Microsoft Press, 1999, 5 pgs.

Mika et al., "Metadata Statistics for a Large Web Corpus," LDOW2012, Apr. 16, 2012, 6 pgs.

Oxford Dictionary of Computing (6th Ed.), 2008, 5 pgs.

Paxson, Vern, "Bro: a System for Detecting Network Intruders in Real-Time," Proceedings of the 7th USENIX Security Symposium, Jan. 1998, 22 pgs.

Fortinet Inc., U.S. Appl. No. 62/503,252, "Building a Cooperative Security Fabric of Hierarchically Interconnected Network Security Devices." n.d., 87 pgs.

Song et al., "Practical techniques for searches on encrypted data," In Proceeding 2000 IEEE symposium on security and privacy. S&P. 2000, May 2000, pp. 44-55.

Dean, Tamara, Guide to Telecommunications Technology, Course Technology, 2003, 5 pgs.

U.S. Appl. No. 60/520,577, "Device, System, and Method for Defending a Computer Network," Nov. 17, 2003, 21 pgs.

U.S. Appl. No. 60/552,457, "Fortinet Security Update Technology," Mar. 2004, 6 pgs.

Tittel, Ed, Unified Threat Management For Dummies, John Wiley & Sons, Inc., 2012, 76 pgs.

Fortinet, FortiOS Handbook: UTM Guide (Version 2), Oct. 15, 2010, 188 pgs.

Full Definition of Security, Wayback Machine Archive of Merriam-Webster on Nov. 17, 2016, 1 pg.

Definition of Cooperative, Wayback Machine Archive of Merriam-Webster on Nov. 26, 2016, 1 pg.

Pfaffenberger, Bryan, Webster's New World Computer Dictionary, (10th Ed.), 2003, 5 pgs.

U.S. Appl. No. 18/451,010 Non-Final Office Action dated Sep. 10, 2024, 27 pages.

U.S. Appl. No. 18/451,014—Notice of Allowance dated Aug. 6, 2024, 10 pages.

* cited by examiner

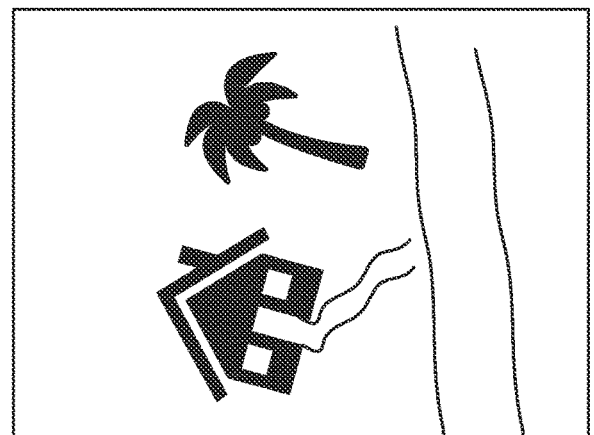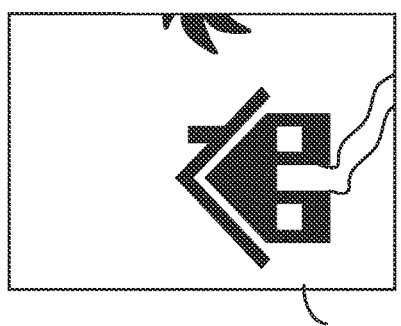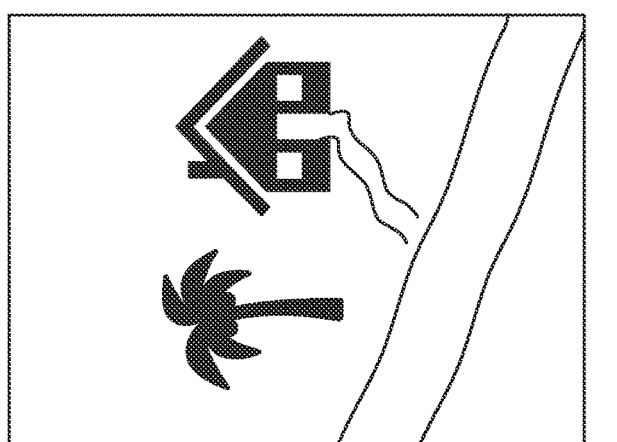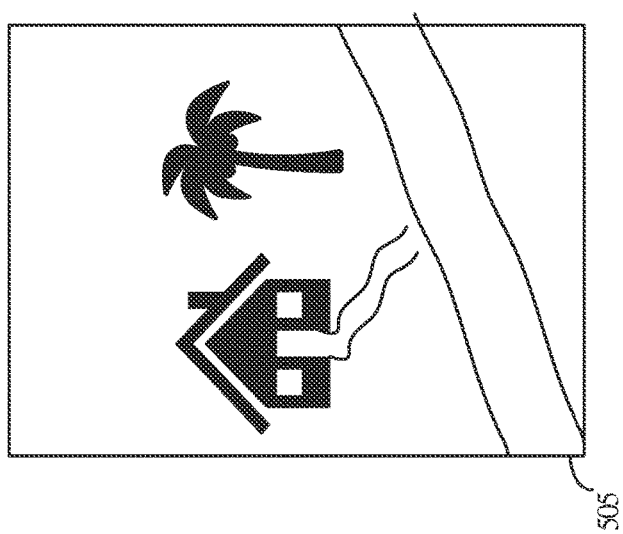
FIG. 5

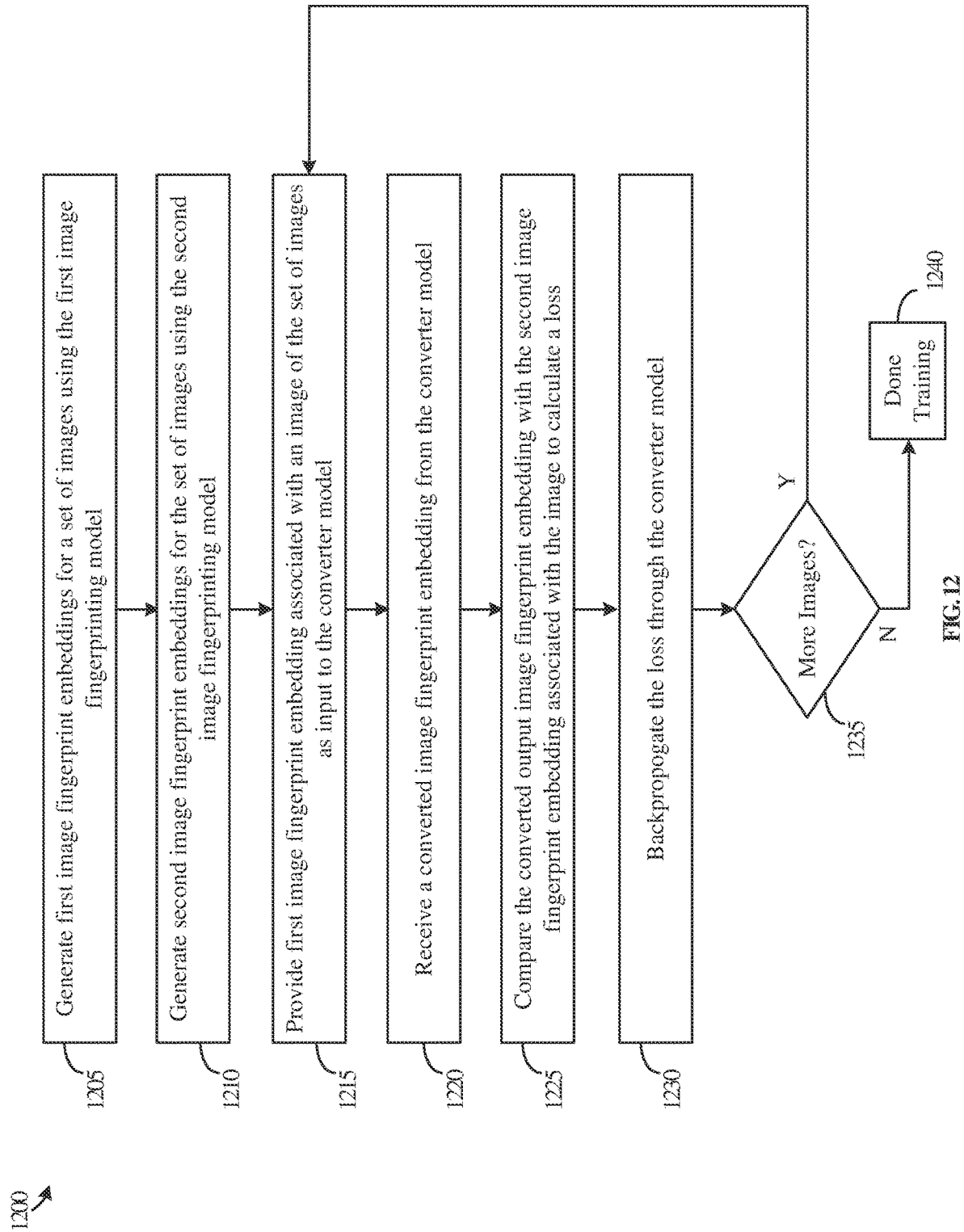

New File Classifier — 1300

File Classifier Name

Upload Training Files — 1305

- ● Positive Training Data ⓘ — 1310
- ○ Negative Training Data ⓘ — 1315

Upload at least 20 training files in a folder or compressed zip file to train this file classifier's ML model (max. 8MB).

Drag & drop files here or Select Files — 1320

Percent Match

Specify percent of file has to match as threshold for classification. Recommended default 85%.

70% |————[ 1325 ]————| 100%   85 %

Submit — 1330

FIG. 13

IMAGE CLASSIFIER AUTOMATED TESTING AND OUTLIER DETECTION

CROSS REFERENCE TO RELATED APPLICATIONS

This application is related to U.S. patent application Ser. No. 18/450,999, titled "IMAGE MATCHING USING DEEP LEARNING IMAGE FINGERPRINTING MODELS AND EMBEDDINGS," filed Aug. 16, 2023, the contents of which is incorporated herein by reference in its entirety for all purposes.

This application is related to U.S. patent application Ser. No. 18/451,010, titled "IMAGE CLASSIFICATION AND ACCELERATED CLASSIFICATION TRAINING USING DEEP LEARNING IMAGE FINGERPRINTING MODELS AND INDEXED EMBEDDINGS," filed Aug. 16, 2023, the contents of which is incorporated herein by reference in its entirety for all purposes.

This application is related to U.S. patent application Ser. No. 18/451,014, titled "IMAGE FINGERPRINTING CONVERSION BETWEEN DIFFERENT IMAGE FINGERPRINTING MODELS," filed Aug. 16, 2023, the contents of which is incorporated herein by reference in its entirety for all purposes.

BACKGROUND

Images may contain private information or intellectual property. For this reason, when protecting data, it may be important to compare images being moved, stored, or shared to known images a customer wishes to protect. Historically, image matching provides very specific matching using file hashing. While it is fast and reliable for exact images, if a file has been modified at all, the hash will change and the images will not match. Some hashing methods attempt to address this issue, such as perceptual hash (pHash), but those methods cannot match images that have been rotated or cropped well. Only extremely small rotations or crops can be identified correctly with those systems. Accordingly, improved image matching is needed.

Further, when classifying images, new image classifiers require huge training data sets and large amounts of time and processing. If a user would like a classifier, the number of images needed is difficult to obtain, and often users cannot train their own classifiers. Accordingly, improved classifier training is needed.

Moreover, training and testing of typical image classifiers each often require large datasets. To train the image classifier, a large training image dataset is needed. A different large image testing dataset is also needed to determine whether the trained image classifier is of sufficient quality. The training images need to differ from the testing images because if the training images are the same as the testing images, the results will be skewed to indicate the trained classifier functions far better than it might actually function when unknown images are submitted for classification. These additional images are often difficult to obtain, and the private or protected data in the images further hinders using and maintaining the images for future use, training, and testing.

Additionally, over the course of using models for image embedding and the like, improvements may be needed. Retraining or otherwise changing the deep learning of models make the output embeddings incompatible. The images may need to be provided to the new model for creation of embeddings. This is time consuming and costly, and sometimes the original images are not available for analysis. Accordingly, improved methods for improving models is needed.

SUMMARY

Methods, systems, and computer-readable memory devices storing instructions are described that perform enhanced image fingerprinting techniques for image matching and image classifying.

A deep learning image fingerprinting model is used to generate a semantically rich, multi-dimensional feature vector (embedding) that represents visual aspects of the input image. A set of images may be fingerprinted and used to train an approximate nearest neighbors model. The embeddings (i.e., fingerprints) from the set of images are indexed and the approximate nearest neighbors model generated to use the index to identify a most similar image embedding from the index along with a score indicating the similarity between an input image embedding and the most similar image embedding from the index. To use the image matcher, the subject image is fingerprinted and input into the approximate nearest neighbors model. If the score returned with the most similar image embedding exceeds a threshold, the images are a match. This type of matching allows for identification of a match even if an image is distorted or changed. For example, an image that has been transformed with, for example, color distortion, blurring, cropping, rotation, or the like are all identified as matches. Generally, this matching works much like a human in that if a human seeing the image would identify the image as a match, the system will identify a match.

The embeddings from the deep learning fingerprinting model may also be used for an image classifier. The embeddings are similarly indexed and an approximate nearest neighbors model generated to use the index to identify a most similar image embedding from the index. The image embeddings in the index are clustered such that similar images that should all be classified with the same label are in a cluster. Labels are applied to the embedding clusters. To use the image classifier, a subject image is fingerprinted and input into the approximate nearest neighbors model. A label of the most similar embedding and a score are returned. If the score exceeds a threshold, the image is labeled with the label. Users can easily train their own classifiers with only a few images. A user may provide as few as twenty (20) images and a class label. The images can be fingerprinted by the deep learning fingerprinting model and added to the index. An approximate nearest neighbors model is generated to use the new index, and the embeddings in the index are clustered such that the embeddings associated with the images uploaded by the user are all in a cluster and the user-defined label is applied to the cluster. When a new image is classified that belongs in the class, it will be fingerprinted, and the approximate nearest neighbors model will identify an image embedding in the user-created cluster so that the new image is classified with the user-defined label. The ability to train a classifier with such a limited number of images is a vast improvement as classifiers typically require thousands of images for training. Additionally, the image classifier can be ready for deployment in a matter of just minutes or even seconds.

The image classifier (i.e., the index and associated approximate nearest neighbors model) can be trained quickly, and it can be tested just as quickly. Within minutes of providing the images and class label, the system can train the image classifier, test the image classifier, and identify any outlier images in the provided images. To test the image classifier, the system can use cross validation (e.g., Leave Out One Cross Validation ("LOOCV")). Training iterations are run until every image embedding has been left out for one iteration. For example, if twenty images are provided, there will be twenty training iterations. A training iteration includes leaving one image embedding out, indexing the remaining image embeddings (test index), and generating a test approximate nearest neighbors model to use the test index to identify a most similar image embedding from the test index. The image embedding left out is submitted to the test approximate nearest neighbors model for classification. Recall of the test classifiers are averaged, and the average recall score is used to determine the quality of the image classifier. If the average recall score falls below a threshold value, the image classifier may be considered a poor or low quality image classifier, and the user may be notified. The notification may suggest to the user to add more images to the provided image dataset, improve the quality of the provided images, or lower the match threshold value. The notification to the user can be provided almost immediately (e.g., less than 10 minutes), and any changes to the image dataset provided by the user can similarly be used to generate a new image classifier and test it within mere moments.

Outlier images can be identified as outliers quickly as well. For example, if the user provides twenty-five images of a shoe design and one image of a person, the image of the person can quickly be identified as an outlier and the user notified. The user may then remove the outlier image from the provided image dataset. In some embodiments, the system can automatically remove outlier images from the training image dataset. In other words, the outlier image embedding can be excluded from the index and approximate nearest neighbors model of the image classifier. The outliers can be identified by calculating the centroid of the embedding space of the image fingerprint embeddings associated with the images provided by the user. The system can then calculate a distance of each image fingerprint embedding from the centroid. When the z-score of the distance exceeds a threshold (e.g., five sigma), the associated image embedding is identified as an outlier. Z-scores that do not exceed the threshold are considered inliers.

Over time, the deep learning image fingerprinting model may be improved, updated, or retrained. When that occurs, the image embeddings generated by the original image fingerprinting model will be different from the image embeddings generated by the new image fingerprinting model. For that reason, they cannot both be used in the same index. It may be desirous to use image embeddings from the images associated with the original image embeddings, but the images may not be available, or it may be time consuming and processing intensive to regenerate all the image embeddings with the new image fingerprinting model. An embedding converter may be used to convert image embeddings generated by the original image fingerprinting model to image embeddings compatible with image embeddings generated by the new image fingerprinting model. The embedding converter may be trained by using a new set of training images.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 5 illustrates a series of images that would be matched with the image matching, according to some embodiments.

FIG. 12 illustrates a method of training an image embedding converter model, according to some embodiments.

FIG. 13 illustrates an example graphical user interface for creating a user-trained classifier, according to some embodiments.

DETAILED DESCRIPTION

Figure 1:
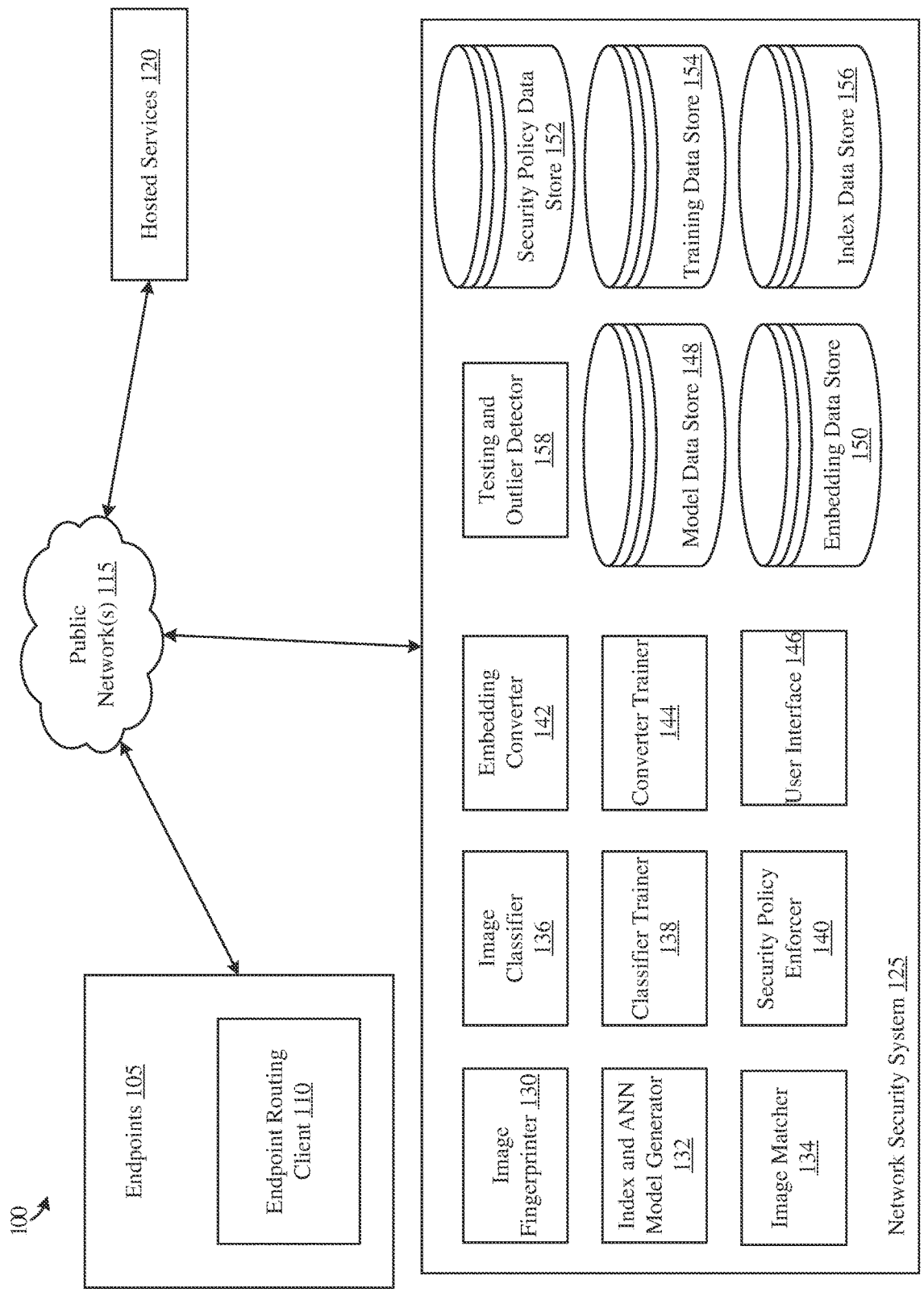
FIG. 1 illustrates a network security system that includes image fingerprinting components, according to some embodiments.

Images may be important in network security systems. Images may contain private information or intellectual property. For that reason, when protecting customer data from data breaches, it may be helpful to compare image data being moved or stored to known images that customer wishes to protect. However, existing image matching systems are lacking.

In prior systems, image fingerprinting may be performed with file hashing such as md5 or sha256. File hashing is very fast and reliable as long as the file has not been modified in any way. Any change to the image or file, even flipping one bit, will completely change the hash so that it can no longer be matched to the original image file. Perceptual hash (pHash) is another image fingerprinting solution which uses image processing methods to generate a fingerprint. pHash can handle some file changes and some image distortions such as blurring and color distortion. However, since it does not use deep learning, it does not perform as well on geometric distortions such as rotation and cropping.

The present invention provides an image fingerprinting and matching system and methods that are able to identify matches despite all types of image changes including image distortions, blurring, color distortion, rotation, cropping, and the like. The deep learning used to generate the image fingerprints (embeddings) ensures the system is both robust against transformations or distortions of the image and in a manner where similar images can be queried for quickly.

This image matching system can be used in a network security system to ensure Data Loss Prevention (DLP). Images that a customer may wish to protect from possible data breaches are fingerprinted using the deep learning image fingerprinting model. The resulting fingerprints are semantically rich, multi-dimensional feature vectors called embeddings (embeddings and fingerprints are used interchangeably throughout) which are semi-unique to the fingerprinted image. Visually similar images will produce embeddings that are closer together in the embedding space (e.g., smaller angular distance) than visually dissimilar images. This allows images which have been distorted or transformed (for example by rotation, cropping, or color distortion) to match back to their fingerprinted original. The fingerprints of protected images are added to the index of an approximate nearest neighbors model, which given a subject fingerprint from a subject image, will retrieve the most similar embedding from the index. As long as the differences between the subject fingerprint and the identified protected image fingerprint in the index are sufficiently small as represented by the score, it is considered a match. As part of DLP, customer cloud data may be scanned for images. Image fingerprint embeddings can be computed for each image with the image fingerprinting model. If the fingerprint of a scanned image matches the fingerprint of an image that the customer wishes to protect, a security policy can be enforced. For example, an administrator may be alerted.

The image fingerprinting model may further be used to generate embeddings used to classify images in an image classifier. Similar to the image matching system described above, the embeddings are added to the index and an associated approximate nearest neighbors model is generated. The embeddings in the index are clustered into embedding clusters of similar images that are of the same class. Labels are applied to the embedding clusters so that all the embeddings in a given cluster have the label. When a subject image fingerprint (generated from the image fingerprinting model) is input to the approximate nearest neighbors model, it will retrieve the label of the most similar embedding from the index. As long as the differences between the subject fingerprint and the identified image fingerprint in the index are sufficiently small as represented by the score, the subject image will be classified with the label.

Image classifying may be useful in network security systems. For example, images classified with specific labels may be subject to certain security policies. A user may wish to quickly generate a new class for specific types of images, particularly images of products they may wish to protect. For example, a user may wish to protect a new design of a product and limit the ability of other users within the company to share or otherwise distribute images of the new design. However, training image classifiers has been time and resource intensive. In previous systems, the fastest way to train a new image classifier is using transfer learning.

In transfer learning, a pretrained model has been trained on a larger database of unrelated data and is either retrained or fine-tuned on the smaller dataset. Finetuning involves updating the deep learning network through backpropagation and therefore takes a considerable amount of time and is very resource intensive.

The present invention can be used to quickly train a new image classifier with a limited set of data. As few as twenty (20) images of a new class that one wishes to classify are fingerprinted and added to the nearest neighbors index. While as few as twenty images can be used to get acceptable results in downstream uses like image matching and image classifying, more images will improve accuracy. Instead of labeling each index entry with a unique label, all reference indices are labeled with the user-defined class name. In this way, they form a cluster in embedding space. When an image is input for classification, if it matches the new class, it is labeled with the user-defined class name (label).

Additionally, the image classifier can be tested and outliers in the training dataset (i.e., the images provided for creating the classifier) detected almost instantaneously. For many enterprises, the images themselves are protected (i.e., they represent private or intellectual property), so the images of the new class cannot be inspected. Further, in many instances only a small number (e.g., twenty to forty (20-40)) of images are provided for training the image classifier to label the new class. The system can use cross validation to test the quality of the image classifier. For example, Leave One Out Cross Validation ("LOOCV") can be used. The system runs a test iteration for each image provided. For example, if the user provides twenty (20) images, twenty test iterations will be performed. A test iteration is performed by leaving one image fingerprint out of the image fingerprints and using the remaining image fingerprints to generate an index and an associated approximate nearest neighbors model. The left out image fingerprint is submitted to the approximate nearest neighbors model to obtain a label and score. Additionally, negative image fingerprints may be included in the index and an embedding space having a negative or default label may be applied to the negative image fingerprints in the index. Further, a different set of negative image fingerprints can be submitted to the approximate nearest neighbors model to be classified. For example, one thousand (1000) negative image fingerprints may be indexed, and a different 1000 negative image fingerprints may be submitted as test samples for each test iteration. The recall of each test iteration can be calculated, and the average recall for all test iterations can be calculated. The average recall for each test iteration can indicate a quality of the image classifier. The image classifier may be identified as low or poor quality when the average recall falls below a threshold, and the image classifier may be identified as high or good quality when the average recall meets or exceeds the threshold. The test iterations can be created and executed within minutes (e.g., less than 10 minutes) when the user uploads thousands of images and within seconds (e.g., less than 60 seconds) when the user uploads hundreds of images.

Outliers can also quickly be detected in the uploaded images. Once the image classifier is generated, the system calculates the centroid of the user-labeled embedding cluster. The system calculates the distance between each image fingerprint and the centroid. When the z-score of the distance exceeds a threshold value (e.g., five sigma), the associated image is identified as an outlier. Z-scores of the distance meeting or falling below the threshold value indicate an inlier. The outliers can also be identified within the time frame for running the testing discussed above.

The present invention is orders of magnitude faster than prior systems because it only needs to pass the new training images forward through the fingerprinting model and add the fingerprints to the index in the nearest neighbors model, avoiding backpropagation. Additionally, fine tuning image models usually requires hundreds if not thousands of images for each new class being trained. The present solution is able to be retrained with as few as twenty samples.

The deep learning image fingerprinting model used for both the image matching and image classifier may need to be retrained, improved, or otherwise changed from the original model (e.g., V1) to a new model (e.g., V2). However, if the fingerprinting model is changed in any way, updated, or retrained, to become a new model V2, the stored customer fingerprints from model V1 will no longer be compatible. The output feature vectors or embeddings of different deep learning models are usually incompatible with one another.

Usually if a model is updated or retrained, embeddings need to be recomputed using the new model. In many applications, including fingerprinting, it is impossible or undesirable for privacy reasons to access the original model inputs needed to perform this recomputation. This invention solves this problem by developing a deep learning model to convert directly the output embeddings from the old model V1 to embeddings compatible with the new model V2. The converter model is an autoencoder which has been used for input image denoising and latent variable generation but is not used as an embedding converter.

The present invention provides numerous technical advantages. For image fingerprint matching, the deep learning fingerprinting model trained using contrastive learning is very robust against transformations or distortions to the images being matched. Prior systems could not provide this level human-type matching. Using the provided system, typically if a human would identify the image as a match, the system will identify a match as well, and if a human would identify no match, the system will not match either. For training an image classifier, the resources needed to train the present classifier with a new class from a user are substantially reduced. Fewer processing cycles are needed since no loss is calculated and backpropagated. Further, memory resources are conserved because the training dataset need only be twenty images rather than the hundreds or thousands previously needed. Further, the ability to convert embeddings generated by a first model to those compatible with embeddings generated by a second model saves memory resources as original images need not be stored. In this way, data is not lost when fingerprinting models need to be updated or retrained.

Turning now to FIG. 1, the components of system 100 that include a network security system 125 with the features of the image fingerprinting, matching, and classifying described above is depicted. System 100 includes endpoints 105, public networks 115, hosted services 120, and network security system 125.

Endpoints 105 comprise user devices including desktops, laptops, mobile devices, and the like. The mobile devices include smartphones, smart watches, and the like. Endpoints 105 may also include internet of things (IoT) devices. Endpoints 105 may include any number of components including those described with respect to computing device 1400 of FIG. 14 including processors, output devices, communication interfaces, input devices, memory, and the like, all not depicted here for clarity. Endpoints 105 may include any number of endpoints, which may be used to access content (e.g., documents, images, and the like) stored in the hosted services 120 and otherwise interact with hosted services 120. Endpoints 105 include endpoint routing client 110. In some embodiments, endpoint routing client 110 may be a client installed on the endpoint 105. In other embodiments, endpoint routing client 110 may be implemented using a gateway that traffic from each endpoint 105 passes through for transmission out of a private or sub-network.

Endpoint routing client 110 routes network traffic transmitted from its respective endpoint 105 to the network security system 125. Depending on the type of device for which endpoint routing client 110 is routing traffic, endpoint routing client 110 may use or be a virtual private network (VPN) such as VPN on demand or per-app-VPN that use certificate-based authentication. For example, for some devices having a first operating system, endpoint routing client 110 me be a per-app-VPN may be used or a set of domain-based VPN profiles may be used. For other devices having a second operating system, endpoint routing client 110 me be a cloud director mobile app. Endpoint routing client 110 can also be an agent that is downloaded using e-mail or silently installed using mass deployment tools.

Public network 115 may be any public network including, for example, the Internet. Public network 115 couples endpoints 105, network security system 125, hosted services 120, such that any may communicate with any other via public network 115. The actual communication path can be point-to-point over public network 115 and may include communication over private networks (not shown). In some embodiments, endpoint routing client 110, might be delivered indirectly, for example, via an application store (not shown). Communications can occur using a variety of network technologies, for example, private networks, Virtual Private Network (VPN), multiprotocol label switching (MPLS), local area network (LAN), wide area network (WAN), Public Switched Telephone Network (PSTN), Session Initiation Protocol (SIP), wireless networks, point-to-point networks, star network, token ring network, hub network, Internet, or the like. Communications may use a variety of protocols. Communications can use appropriate application programming interfaces (APIs) and data interchange formats, for example, Representational State Transfer (REST), JavaScript Object Notation (JSON), Extensible Markup Language (XML), Simple Object Access Protocol (SOAP), Java Message Service (JMS), Java Platform Module System, and the like. Additionally, a variety of authorization and authentication techniques, such as username/password, Open Authorization (OAuth), Kerberos, SecureID, digital certificates and more, can be used to secure communications.

Hosted services 120 can be cloud computing and storage services, financial services, e-commerce services, or any type of applications, websites, or platforms that provide cloud-based storage or web services. Hosted services 120 can be referred to as cloud services, cloud applications, cloud storage applications, cloud computing applications, or the like. Hosted services 120 provide functionality to users that can be implemented in the cloud and that can be the target of data loss prevention (DLP) policies, for example, logging in, editing documents, downloading data, reading customer contact information, entering payables, deleting documents, and the like. Hosted services 120 can be a network service or application, or can be web-based (e.g., accessed via a URL) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. While only one hosted services 120 is depicted in FIG. 1, any number of hosted services may be available and included in system 100. Hosted services may be sanctioned (e.g., those that a company provides for employee use and of which the company's information technology (IT) department is aware) or unsanctioned (e.g., those a company is not aware of or otherwise are not authorized for use by the company).

Network security system 125 may provide network security services to endpoints 105. Endpoint routing client 110 may route traffic from the endpoints 105 to network security system 125 to enforce security policies including DLP policies. Network security system 125 may be one or more computing systems such as computing device 1400 as described with respect to FIG. 14. Network security system includes image fingerprinter 130, index and approximate nearest neighbors (ANN) model generator 132, image matcher 134, image classifier 136, classifier trainer 138, security policy enforcer 140, embedding converter 142, converter trainer 144, user interface 146, model data store 148, embedding data store 150, security policy data store 152, training data store 154, and index data store 156. The modules of network security system 125 may be implemented in hardware or software and need not be divided up in precisely the same blocks as shown in FIG. 1. Some of the modules can also be implemented on different processors or computers or spread among any number of different processors or computers. In addition, in some embodiments, modules may be combined, operated in parallel, or in a different sequence than that shown without affecting the functions achieved and without departing from the spirit of this disclosure. Also, as used herein, the term "module" can include "sub-modules," which themselves can be considered to constitute modules. The term module may be interchanged with component and neither term requires a specific hardware element but rather indicates a device or software that is used to provide the described functionality. The modules (i.e., shown as blocks and data stores) in network security system 125 may, in some embodiments, also be thought of as flowchart steps in a method. In some embodiments, a software module need not have all its code disposed contiguously in memory (e.g., some parts of the code can be separated from other parts of the code with code from other modules or other functions disposed in between).

Image fingerprinter 130 uses a deep learning image fingerprinting model, stored in model data store 148, to generate image fingerprints, also called image embeddings throughout. A single image fingerprinting model is used for each of the image fingerprints so they are compatible throughout the system with each of the described components. Image fingerprinter 130 receives an image for which an image fingerprint is desired. Image fingerprinter 130 may perform functions on the image data to provide the image data as input to the image fingerprinting model. Image fingerprinter 130 provides the image data to the image fingerprinting model and receives, as output, an image fingerprint (i.e., an image embedding). Image embeddings are semantically rich multi-dimensional feature vectors. For example, the feature vectors may have five hundred twelve (512) dimensions. Image fingerprinter 130 provides the image embeddings once received from the deep learning image fingerprinting model.

The deep learning image fingerprinting model may be a neural network (NN)-based image encoder model (e.g., a convolutional neural network (CNN)). The image fingerprinting model may be trained using contrastive training framework such as, for example, simCLR. Image models may be trained in an unsupervised fashion by taking each sample image and transforming (augmenting) it in a way that does not destroy the semantic information in the image. For example, random rotations, random color distortions, and random crops (e.g., with the crop size restricted to a large area of the original image) may be used to augment the sample image. These augmented sample images are used to train the image fingerprinting model. The image fingerprinting model takes image data as inputs and, in return, outputs an image embedding (e.g., a multi-dimensional feature vector). During training, the image fingerprinting model learns to maximize the similarity of the image embedding from the original image to that of the augmented image while simultaneously minimizing the similarity to all other images in the batch of training images. A loss function is used for training, which may be, for example, essentially the softmax of the cosine similarity of all pairs of image representations including the original and augmented original image. After training, the image fingerprinting model can transform images into a generic and semantically rich vector representation (i.e., the image embeddings) without the need of supervised training. The image embeddings can then be used in a downstream model such as the described image matching or image classifying.

Index and ANN model generator 132 generates an index by indexing image embeddings and generates an ANN model to use with the index. Index and ANN model generator 132 may store the indexes in index data store 156 and the ANN models in model data store 148. In some embodiments, index data store 156 is not used because indexes are not stored. In such embodiments, an index is built dynamically in memory on demand when an index is needed. For example, when an index is needed for image matching or image classification, the relevant image embeddings are accessed from embedding data store 150 and the index is generated and used by the ANN model. Image embeddings may be received from image fingerprinter 130 and used to generate a new index or may be added to an existing index. When adding to an existing index, the previous index may be stored and a new index generated including both the old image embeddings and the newly added image embeddings. When the index is dynamically generated, the new image embeddings are stored with the old image embeddings to generate the new index. Any time an index is newly generated or modified, or the stored embeddings used to dynamically generate the index are changed, a new ANN model is generated to use with the index because the ANN model and associated index are linked to be used together. Each index creates an embedding space, and the ANN model is trained to identify, given a subject embedding, the closest reference image embedding in the embedding space. Embedding similarity is measured by angular distance. An example equation is $D=\sqrt{2-2*\cos(x\_r, x\_s)}$ where $x\_r$ is the reference embedding, and $x\_s$ is the subject embedding. In some embodiments, the Annoy framework is used which leverages the approximate nearest neighbors algorithm to retrieve similar vectors from the index.

For image matching, index and ANN model generator 132 generates the ANN model such that it is trained to return the image embedding of the most similar image and a score indicating the similarity. For example, the score may be a distance calculation normalized to a value between zero and one hundred (0-100), which may be thought of as a percent of similarity. For example, the score may be an angular distance representing the differences between the two embeddings. In such an example, a maximum distance is an angle of Pi divided by two (Pi/2) and a minimum distance is an angle of zero (0). A zero angle results from one hundred percent (100%) similarity, and a Pi divided by two (Pi/2) angle results from zero percent (0%) similarity. An example equation is $(Pi/2-\mathrm{acos}(1-\mathrm{AngularDistance}*\mathrm{AngularDistance}/2))/(Pi/2)$. In other words, a score of seventy (70) may indicate the images of the corresponding image embeddings may be thought of as approximately seventy (70) percent similar. While the score does not exactly correspond to a percentage of similarity, it provides a meaningful value indicating a likelihood that the images match. Accordingly, the smaller the value, the less likely the images match.

For image classification, index and ANN model generator 132 clusters the image embeddings in the index into embedding clusters. Index and ANN model generator 132 labels the embedding clusters with a corresponding label such that each image embedding in the embedding cluster is labeled with the label for the cluster. Index and ANN model generator 132 generates the ANN model to return the label of the image embedding of the most similar image and a score indicating the similarity. For example, the score may be an angular distance normalized to a value between zero and one hundred (0-100), which may be thought of as a percent of similarity. In other words, a score of eighty-five (85) may be thought of as representing that the images of the corresponding image embeddings are approximately eighty-five (85) percent similar.

Image matcher 134 may be used to identify matching images. For example, a customer may wish to protect certain images or designs. Image matcher 134 may be used to identify images that match the protected images by scanning documents stored in hosted services 120 or may identify images when users engage with the image or document containing the image by uploading, downloading, sharing, moving, or otherwise interacting with the image on endpoints 105. Image matcher 134 may receive the image and transmit the image to image fingerprinter 130 to obtain the image embedding. Image matcher 134 may then access the ANN model stored in model data store 148 used for image matching and provide the image embedding as an input to the ANN model. In some embodiments, multiple ANN models may be stored in model data store 148. Image matcher 134 may choose the most recent image matching ANN model, in some embodiments. In some embodiments, image matcher 134 may choose the ANN model from model data store 148 based on the set of images that the subject image is to be matched against. For example, image data sets may be named when uploaded for matching, and the user may select which image data set should be matched against when providing an image. In some embodiments, image matcher 134 may use multiple ANN models to check multiple image data sets for a match. Image matcher 134 may receive the most similar image embedding and the score in return. Image matcher 134 may include a threshold value to compare the score with. The threshold value may be, for example eighty-five (85), indicating generally that the image embedding and the most similar image embedding are approximately 85% similar. A threshold value of eighty-five (85) proved robust enough to identify most matches while limiting false positives in the tested system, however any appropriate threshold value may be used. When the score exceeds, or is equal to, the threshold value, the image may be identified as a match. When the score is below the threshold value, the image may be identified as not a match. Image matcher 134 may apply metadata to the image to indicate whether it is a match or not in some embodiments. Image matcher 134 may transmit the image and an indication of whether or not the image matches a protected image to security policy enforcer 140 for enforcing a security policy based on whether or not the image is a match (i.e., based on the score).

Image classifier 136 may be used to classify images and may be used to apply one or more labels to images based on the classifications. For example, certain types of images may be protected, or a client may otherwise want to label the images. Image classifier 136 may be used to identify classes an image belongs to. Image classifier 136 may identify images for classifying by scanning documents stored in hosted services 120 or may identify images when users engage with the image or document containing the image by uploading, downloading, sharing, moving, or otherwise interacting with the image on endpoints 105. Image classifier 136 may receive the image and transmit the image to image fingerprinter 130 to obtain the image embedding. Image classifier 136 may then access one or more ANN models stored in model data store 148 used for image classifying and provide the image embedding as an input to the ANN models. Image classifier 136 may select the most recent image classifying ANN model. In some embodiments, image classifier 136 may select all ANN models having a classifier that may be relevant for the given image to be classified against. For example, a user may train multiple classifiers using classifier trainer 138, and each of the relevant generated ANN models may be used by image classifier 136. Image classifier 136 may receive the label of the most similar image embedding and the score in return. Image classifier 136 may include a threshold value to compare the score with. The threshold value may be, for example eighty-five (85), indicating generally that the image embedding and the most similar image embedding are approximately 85% similar. A threshold value of eighty-five (85) proved robust enough to identify most matches while limiting false positives in the tested system, however any appropriate threshold value may be used. When the score exceeds, or is equal to, the threshold value, the returned label may be applied to the subject image. When the score is below the threshold value, the label is not applied to the image. Image classifier 136 may apply metadata to the image to indicate the applied label. In some embodiments, if multiple ANN models are used, any label returned with a score equal to or exceeding the threshold value may be applied to the subject image, resulting in an image that has multiple labels. For example, if a first label is returned from a first ANN model with a score of eighty-seven (87) and a second label is returned from a second ANN model with a score of ninety-two (92), both the first label and the second label may be applied to the subject image. In some embodiments, only the label having the highest score that is equal to or exceeds the threshold value is applied. For example, if a first label is returned from a first ANN model with a score of eighty-seven (87) and a second label is returned from a second ANN model with a score of ninety-two (92), the second label may be applied to the subject image. If no labels are returned with a score exceeding (or equal to) the threshold value, a default label (e.g., "other") may be applied to the image. Image classifier 136 may transmit the image and an indication of applied labels to security policy enforcer 140 for enforcing a security policy based on the image classification (i.e., based on the score).

Classifier trainer 138 is used to quickly train a new classifier, which can allow a user to specify and create classifiers based on their own information quickly and easily. Classifier trainer 138 does not use the expensive retraining of the deep learning image fingerprinting model and does not need large amounts of data to fine tune an end-to-end CNN model. Classifier trainer 138 uses user interface 146 to obtain images and a class label from the user. The user can provide a set of as few as twenty (20)

images and a class label. While as few as twenty images can be used and results in acceptable results from image classifier 136, more user images will provide better accuracy. For example, forty (40) images provide better accuracy, and eighty (80) images provide even better accuracy. Less than one hundred (100) images are needed to provide solid accuracy. Classifier trainer 138 inputs the images to image fingerprinter 130 to get image embeddings for the training images. Classifier trainer 138 uses index and ANN model generator 132 to add the new training embeddings to a base index. When generating this user-defined classifier (also called Train Your Own Classifier (TYOC)), a base index that may include negative image embeddings classified with a default label (e.g., "other") may be used. In some embodiments the base index may also include other general classes. In some embodiments, the user may be able to add multiple classes by adding to the prior user-defined classifier. In some embodiments, the user may also be able to add additional negative image embeddings. In some embodiments, if a user uploads an image with an image embedding already in the index, the image embedding in the index may be reclassified into the embedding cluster with the new user-defined label. In other embodiments, the additional label may be added, and the image embedding may be in more than one embedding cluster. In some embodiments, a user-defined negative image may overwrite other labels applied to the image previously. In some embodiments, prior to or after generating the user-defined classifier, classifier trainer 138 may submit the image embeddings from image fingerprinter 130 to classifier testing and outlier detector 158 to test the user-defined classifier and identify any outliers in the image embeddings.

Classifier trainer 138 is fast and efficient because it does not need retraining of the deep learning fingerprinting model. Instead, the training images (e.g., approximately twenty to one hundred training images) are added to the index. Instead of labeling each index entry (i.e., image embedding) with a unique label, all added image embeddings are labeled with the user-defined label (i.e., class name). In this way, the user-provided training images form a cluster in embedding space and are easily used to classify new image embeddings using image classifier 136 without extensive retraining of deep learning models or large training data sets.

Classifier testing and outlier detector 158 is used to test user-defined classifiers (e.g., TYOCs) as well as check for outliers in the images uploaded by the user. Both the classifier testing and outlier detection can occur nearly instantaneously to provide the user with indications of the quality of their user-defined classifier and of images that may be outliers within moments (e.g., less than 10 minutes for approximately forty thousand uploaded images; less than 5 minutes approximately ten thousand images uploaded; less than 1 minute for approximately one thousand images uploaded; less than 30 seconds for approximately one hundred images uploaded) of the user uploading the images. Classifier testing and outlier detector 158 tests the user defined image classifier immediately upon creating the new ANN model and associated index that can be used by image classifier 136 to label an image with a user-defined label. For example, once classifier trainer 138 receives the uploaded images via user interface 146 and generates the new ANN model and associated index, classifier testing and outlier detector 158 begins testing the new ANN model and associated index (i.e., the new image classifier).

Classifier testing and outlier detector 158 may use Leave One Out Cross Validation ("LOOCV") to determine the quality of the new index and associated ANN model. Because the images may include protected data, the images cannot be inspected so that testing images can be located. Additionally, since the training data set is typically small (less than 100 images uploaded by the user), the training data set cannot be reliably split to create a training set and testing set. LOOCV works by using each image embedding in the training data as testing data for one testing iteration, and running a testing iteration for each training data sample (i.e., each uploaded image). By leaving one out each iteration, the classifiers created for each training iteration closely resemble the user-defined classifier. Accordingly, classifier testing and outlier detector 158 may start with the set of image embeddings associated with the set of images uploaded by the user. As discussed above, the image embeddings are generated by classifier trainer 138 using image fingerprinter 130. Classifier testing and outlier detector 158 runs a testing iteration for each image embedding associated with an image uploaded by the user for the class. Therefore, there will be the same number of testing iterations as the number of images uploaded by the user. For example, if the user uploads twenty images, each image will be tested, so twenty testing iterations will be completed. A testing iteration may include generating a testing ANN model and associated testing index using index and ANN model generator 132. For example, classifier testing and outlier detector 158 may use classifier trainer 138 to iteratively train each testing classifier (i.e., each testing index and associated testing ANN model) using the image embeddings that are generated initially by classifier trainer 138. For a given iteration, classifier testing and outlier detector 158 selects one image embedding from the entire set of image embeddings as the test embedding. Classifier testing and outlier detector 158 may provide the remaining image embeddings to classifier trainer 138 to generate the testing index using the remaining image embeddings (i.e., all image embeddings except the one image embedding used for the testing iteration). Additionally, the testing index may be generated using the same base index used to generate the user-defined classifier index by classifier trainer 138 to ensure the testing index and associated testing ANN model most closely resembles the index and associated ANN model of the user-defined classifier that will be available to the user. Accordingly, any negative image embeddings in the base index will be included in the testing index. In some embodiments, there are one thousand (1000) negative image embeddings in the base index, though any number of negative image embeddings may be used in the base index. Once the testing index and associated testing ANN model are generated, classifier testing and outlier detector 158 submits the left out image embedding (i.e., test embedding) to image classifier 136 to submit as input for classification to the testing ANN model. The testing ANN model is trained to provide the label and score associated with the most similar image embedding in the testing index. When submitting the request to image classifier 136, classifier testing and outlier detector 158 may be able to indicate which testing index and associated testing ANN model to apply to the test embedding for classification. The testing ANN model will output a label and score for the test embedding. The score is compared to the threshold value set for the image classifier to determine whether to apply the returned label to the image either by image classifier 136 or classifier testing and outlier detector 158. In some embodiments, as discussed with respect to FIG. 13, the user may select the threshold value when uploading the images. In some embodiments, a second set of negative image embeddings are submitted as input to the testing ANN model for classification. Accordingly, each negative image embedding is submitted to image classifier 136 by classifier testing and outlier detector 158. The second set of negative image embeddings (i.e., negative test samples) can be used to identify a false positive rate of the testing ANN model and associated testing index. The negative test samples include different image embeddings than those used in the base index to ensure accurate testing. In some embodiments, one thousand (1000) negative test samples are used in the testing iteration, though any number of negative test samples can be used. Classifier testing and outlier detector 158 calculates a recall value of the testing ANN model and associated testing index for each testing iteration. The recall value can be calculated as the number of true positives divided by the number of true positives plus the number of false negatives. For each testing ANN model and associated testing index, the number of true positives will be calculated by determining the number of image embeddings that are correctly labeled with the user-defined label. Since only one image embedding is tested in each testing iteration that belongs to the user-defined class, the true positive value may be either one (1) if the testing image embedding is correctly labeled with the user-defined label or zero (0) if the testing image embedding is not correctly labeled with the user-defined label. The number of false negatives will be calculated by determining the number of image embeddings that are incorrectly labeled with the negative or default label. The testing image embedding is the only image embedding that can be incorrectly labeled with the negative or default label, so the false negative value is either zero (0) or one (1) and will be the opposite of the true positive value. Accordingly, the recall value will either be one hundred percent (100%) or zero percent (0%) for every testing iteration. Classifier testing and outlier detector 158 may also calculate the false positives rate (i.e., the number of negative image embeddings incorrectly labeled with the user-defined label) for each testing iteration as well as or instead the true negative rate (i.e., the number of negative image embeddings correctly labeled with the default or negative label), the precision (i.e., the number of true positives divided by the number of true positives plus the number of false positives), or any combination.

Once all testing iterations have been run, classifier testing and outlier detector 158 may determine the quality of the image classifier to be used by the user based on the results of the testing iterations. For example, classifier testing and outlier detector 158 may calculate the average recall for all testing iterations. For example, if twenty testing iterations are run, and ten had a recall of 100% while ten had a recall of 0%, the average recall is ten divided by twenty, which is one divided by two or fifty percent (50%). The average recall may be compared to a threshold recall value to determine the quality of the image classifier. For example, a threshold recall value of ninety percent (90%) or higher may be used, and image classifiers having an average recall value higher than 90% considered a high quality classifier. In some embodiments, more than one threshold value can be used. For example, a lower threshold recall value (e.g., 75%) and an upper threshold recall value (e.g., 93%) may be used such that image classifiers with average recall values falling at or above the upper threshold recall value are determined high quality, those with average recall values falling between the lower threshold recall value and the upper threshold recall value are determined medium quality, and those falling at or below the lower threshold recall value are determined low quality. In some embodiments, the false positive rate, precision, or both of each testing iteration may be averaged and used in addition to or instead of the average recall value to determine the quality. For example, a combined score representing the average recall value and the average false positive rate may be used to determine the quality.

Once classifier testing and outlier detector 158 calculates the quality of the image classifier, a notification of the quality may be provided to the user via user interface 146. For example, classifier testing and outlier detector 158 may provide a notification that the classifier is available for use when the image classifier is high quality, and the notification may indicate that the classifier is high quality. classifier testing and outlier detector 158 may provide a similar notification for medium or low quality classifiers as well. In some embodiments, for medium or low quality classifiers, the notification may include a suggestion to upload additional images for the class, a suggestion to upload higher quality images for the class, a suggestion to reduce the threshold value used to determine whether to apply the returned label based on the returned score from the ANN model, or a combination of the suggestions. For example, the user may upload additional images, identify images that more accurately reflect the class and upload them, may replace the previously uploaded images with higher resolution copies of the images. If a user uploads additional or different images, classifier trainer 138 can use index and ANN model generator 132 to create a new ANN model and index using all the relevant uploaded images (e.g., the previously uploaded images and the additional uploaded images or the images replacing previously uploaded images). Classifier testing and outlier detector 158 can also test the newly created ANN model and index, completing the entire process again for the new classifier. In this way, a user obtains instant (within seconds or minutes) access to and indications of the quality of the user-defined image classifier. In some embodiments, the quality of the image classifier may be used by security policy enforcer 140 to set severity levels associated with labels assigned by the image classifier. For example, if a low quality image classifier is used to label an image, the severity level of the classification may be lower than if labeled by a high quality image classifier. The severity levels used by security policy enforcer 140 may determine actions applied based on settings in applied security policies.

Classifier testing and outlier detector 158 may also detect any image outliers from the set of images uploaded by the user. As an example, if the user-defined label is "cars," and twenty four images are images of cars, but one image included (perhaps inadvertently) is an image of a shoe, it is prudent to identify the outlier image and potentially remove it from the embedding cluster associated with the user-defined label of "cars." Such identification and removal may improve the quality of the image classifier. To identify the outliers, classifier testing and outlier detector 158 may calculate a centroid of the user-defined cluster. As previously discussed, index and ANN model generator 132 clusters the image embeddings of the images uploaded by the user in the index into an embedding cluster and applies the user-defined label to the embedding cluster. Classifier testing and outlier detector 158 calculates the centroid of the embedding cluster and calculates a distance (e.g., Euclidean distance) between the centroid and each image embedding associated with the images uploaded by the user. Classifier testing and outlier detector 158 calculates the z-score of each distance and compares the z-scores to a threshold outlier value. Outlier image embeddings will deviate from non-outliers significantly (e.g., 5 sigma/5 standard deviations). The z-scores indicate how many standard deviations (i.e., sigma) above or below the mean the respective distance is. For example, an image embedding that has a z-score equal or greater than 5 standard deviations may be identified as an outlier, though any threshold value can be used.

Once classifier testing and outlier detector 158 identifies any outliers in the uploaded images from the user, classifier testing and outlier detector 158 may provide a notification identifying the outlier images. For example, classifier testing and outlier detector 158 may provide a notification via user interface 146 that indicates the outlier image and asks the user whether the user would prefer to remove the image from the uploaded image set. Upon confirmation by the user, the image classifier can be retrained using the remaining image embeddings by classifier trainer 138, and the newly generated index and associated ANN model can be tested and additional outliers detected by classifier testing and outlier detector 158, completing the entire process again. In some embodiments, classifier testing and outlier detector 158 may automatically remove any outlier image embeddings and network security system 125 may generate the new index using only the remaining image embeddings and the associated ANN model. In some embodiments, classifier testing and outlier detector 158 may notify the user via user interface 146 that the outlier was removed from the uploaded image dataset. While the outlier detection portion of classifier testing and outlier detector 158 is described with respect to identifying outliers in images uploaded by a user for training an image classifier, the same outlier detection methods can be used on any image embeddings clustered for classification regardless of the source of the images.

Security policy enforcer 140 may perform security policy enforcement on images based on results from image classifier 136, image matcher 134, or both. Further, security policy enforcer 140 may perform security policy enforcement on all other messages transmitted to network security system 125. The security policies may include blocking the activity (e.g., moving, sharing, deleting, adding, or the like the information or documents) included in the messages. In other examples, the security policies may include allowing the activity, notifying an administrator of the activity, or providing a notice to the user at the associated endpoint 105.

Regarding security policies enforced by security policy enforcer 140 for image matcher 134, a client may upload specific images for matching for use in DLP. Image matcher 134 may perform image matching for images that are identified based on user activity as messages are passed through network security system 125. For images matched using image matcher 134 based on user activity, security policy enforcer 140 may block the activity, for example. In some embodiments, security policy enforcer 140 may notify an administrator of the activity in addition to or instead of blocking the activity. In some embodiments, client data stored in hosted services 120 may be scanned to identify matching images. When an image is identified in hosted services 120, security policy enforcer 140 may notify an administrator, for example. In some embodiments, security policy enforcer 140 may delete the image from hosted services 120. Security policies may be set to perform any security action based on the configuration of the security policy.

For security policies enforced by security policy enforcer 140 from image classifier 136, a client may train a classifier for classifying images for use in DLP. Security policy enforcer 140 may use the image labels to determine a security policy to enforce. In some embodiments, when the user trains a classifier, the data stored in hosted services 120 can be scanned to identify images to classify. Depending on whether labels are applied to the images, security policy enforcer 140 may enforce a security policy to, for example, notify an administrator of the image, delete the image, or both. Further, images may be classified by image classifier 136 based on user activity intercepted by network security system 125. The activity may be blocked, an administrator notified, or both based on the image labels (i.e., classifications).

Embedding converter 142 may be trained by converter trainer 144 to convert image embeddings from a first deep learning image fingerprinting model to a second deep learning image fingerprinting model (e.g., a first version of the image fingerprinting model to a second version of the image fingerprinting model). For image fingerprinting used for matching and classifying images, it may be undesirable to request reference images from customers more than once. However, it may be advantageous to retrain the underlying deep learning fingerprinting model with real production data in order to improve efficacy, for example. Once the underlying deep learning fingerprinting model is retrained, even when starting with the weights and biases of the old model, an entirely new model is created (e.g., version 2 or V2). Images that are fingerprinted with the first model result in image embeddings that are different and incompatible with the image embeddings generated by the second model. Accordingly, the image embeddings generated by the first model cannot be indexed with the image embeddings generated by the second model because the results will not be accurate. However, the image embeddings generated by the first model may still be needed. For example, they may be image embeddings of the customer's protected information used in an index for image matcher 134. Since the original images may not be available, converting the image embeddings from the first model to be compatible with image embeddings generated by the second model is helpful. Accordingly, converter trainer 144 is used to train a deep learning converter model to convert the image embeddings.

The deep learning converter model uses a deep learning architecture similar to an autoencoder. The input of the model is the image embeddings generated by the first deep learning image fingerprinting model. The output is a converted image embedding compatible with image embeddings generated by the second deep learning image fingerprinting model. Each block of the deep learning converter model consists of a fully connected layer with dropout and Batch Normalization. As in a typical autoencoder, the layers become progressively smaller and then progressively larger. This creates an information bottleneck which forces the converter model to maximize the information content of the image embeddings.

Converter trainer 144 uses a set of training images to train the converter model. The training images may be a different set of training images not used to train either the first image fingerprinting model or the second image fingerprinting model. Converter trainer 144 sends the training images to image fingerprinter 130 to generate a first set of image embeddings using the first image fingerprinting model and a second set of image embeddings using the second image fingerprinting model. Converter trainer 144 passes the first set of image embeddings through the converter model and obtains converted image embeddings. Converter trainer 144 compares the converted image embeddings to the associated image embedding from the second set of image embeddings generated by the second image fingerprinting model. Converter trainer 144 may use Mean Square Error to compare the image embeddings. Converter trainer 144 calculates the loss (e.g., the Mean Square Error) and backpropagates the loss into the converter model to train the converter model. When done with the training, the converter model is trained to produce image embeddings compatible with image embeddings generated by the second image fingerprinting model from image embeddings generated by the first image fingerprinting model. The converter model may be stored in model data store 148.

Once trained, embedding converter 142 may be used to convert all needed image embeddings generated by the first image fingerprinting model to those that are compatible with image embeddings generated by the second image fingerprinting model. Embedding converter may access the image embeddings generated by the first image fingerprinting model and pass them through the converter model to generate converted image embeddings. Embedding converter 142 may also take the sets of converted image embeddings that were used in a given index and provide them to index and ANN model generator 132 to generate new indexes and ANN models. The new indexes and ANN models can be used for new image embeddings generated by the second (i.e., updated) index fingerprinting model to identify matches and to classify images using image matcher 134 and image classifier 136, respectively.

User interface 146 may be used to allow a user to interface with network security system 125 to train a classifier, upload images for matching, set security policies, or the like. A user on an endpoint 105 may access network security system 125 via the user interface 146, which may provide graphical user interfaces for display on the endpoint 105. An example graphical user interface 1300 is depicted in FIG. 13. Endpoint 105 may access user interface 146 via a web browser, an installed app, or the like.

Model data store 148 may store models including deep learning image fingerprinting models, converter models, and the like. Model data store 148 may also store ANN models generated by index and ANN model generator 132. Model data store 148 may be a portion of a larger data store that stores other items or only used for storing models.

Embedding data store 150 may store image embeddings generated by image fingerprinting model. Some image embeddings may be stored for later use including the image embeddings used to generate any of the described indexes. The image embeddings may be used later to generate new indexes of different groupings of the image embeddings, for example. While some image embeddings may be stored, not every image embedding may be stored in some embodiments.

Security policy data store 152 may store security policies used by security policy enforcer 140. The security policies may include those used for image matching and image classification as well as any other security policies used for enforcing security policies by network security system. While image security is discussed throughout, other security policies including other DLP security policies may be enforced with network security system 125, and image security may only be a portion of the security provided by network security system 125.

Training data store 154 may store image data sets that are used for training deep learning models including image fingerprinting models and converter models. Training data store 154 may store historical information about training data sets without maintaining the entire image data set over time. In some embodiments, training data store 154 may be used for staging image data sets for training, and the images may be deleted after image fingerprint embeddings are generated or training is complete. In some embodiments, image data sets that are used by classifier trainer 138 to train classifiers are stored in training data store 154. In some embodiments, image data sets used by classifier trainer 138 are stored only for staging and deleted after image fingerprint embeddings are generated or training is complete. In some embodiments, training data store 154 is not used and other temporary storage is used for staging all image data sets.

Index data store 156 may store indexes generated by index and ANN model generator 132. When replacement indexes are generated, such as, for example, when a new classifier is trained by a user, the old index may be retained in index data store 156 in some embodiments. In other embodiments, the old index may be deleted.

Model data store 148, embedding data store 150, security policy data store 152, training data store 154, and index data store 156 are described as individual data stores, but may be combined in any combination.

The various functionalities of the modules of network security system 125 will be described in use in the descriptions of the following figures.

Figure 2:
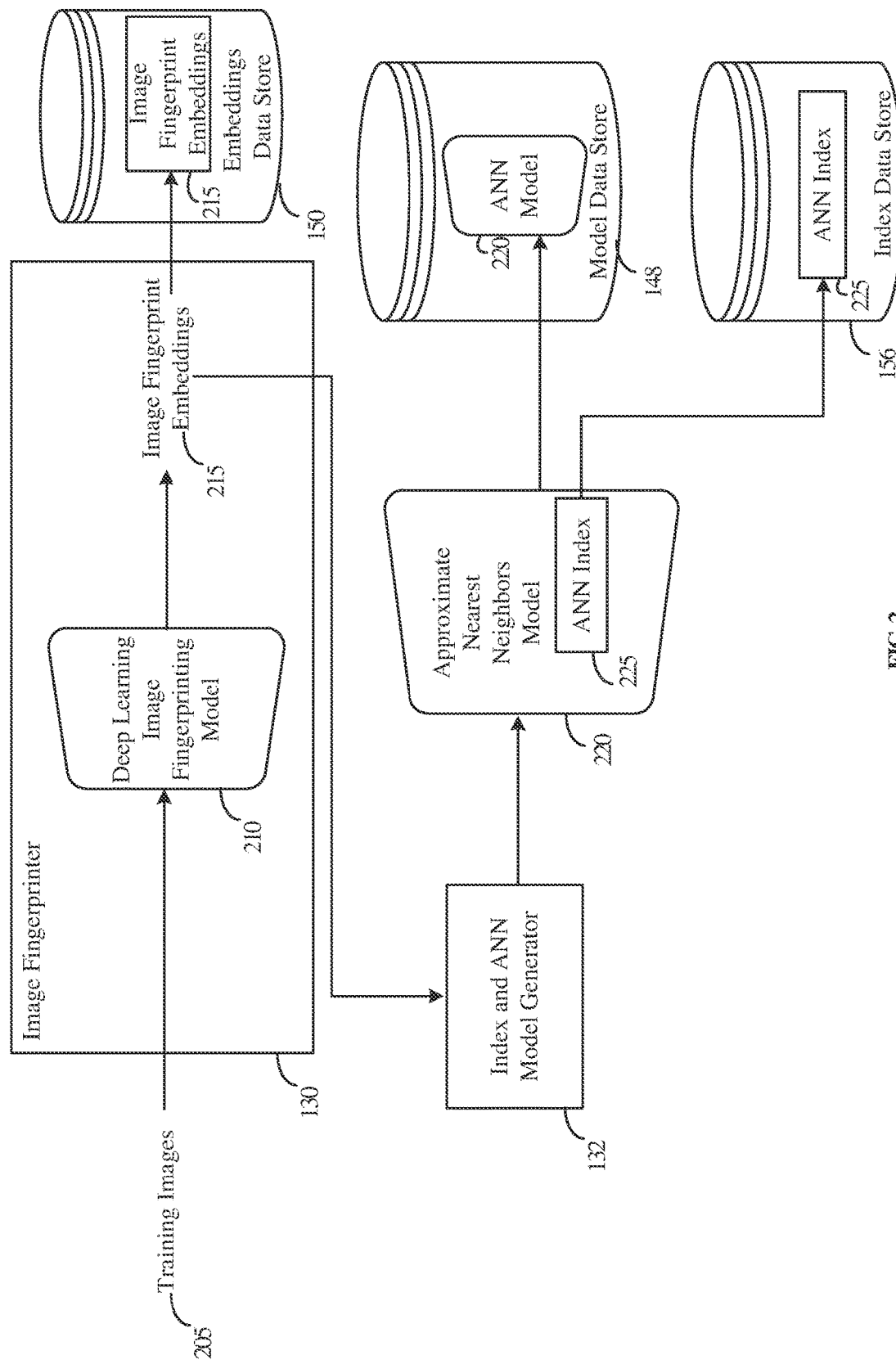
FIG. 2 illustrates a data flow of data for generating an image matching system, according to some embodiments.

FIG. 2 illustrates a data flow 200 for generating an index and training an ANN model for use by image matcher 134. Training images 205 may be obtained from training data store 154. Training images 205 may be input into image fingerprinter 130. Image fingerprinter 130 inputs training images 205 into deep learning image fingerprinting model 210 to generate image fingerprint embeddings 215 from the images. Image fingerprint embeddings 215 may be stored in embeddings data store 150. Image fingerprint embeddings 215 may also be input to index and ANN model generator 132. Index and ANN model generator 132 may index the image fingerprint embeddings 215 into ANN index 225 and train approximate nearest neighbors (ANN) model 220 to use ANN index 225 to identify the most similar image embedding from image fingerprint embeddings 215 to an image embedding of a subject image embedding input into ANN model 220. Once generated and trained, index and ANN model generator 132 stores ANN model 220 into model data store 148 and ANN index 225 in index data store 156. They are now ready to be used by image matcher 134.

Figure 3:
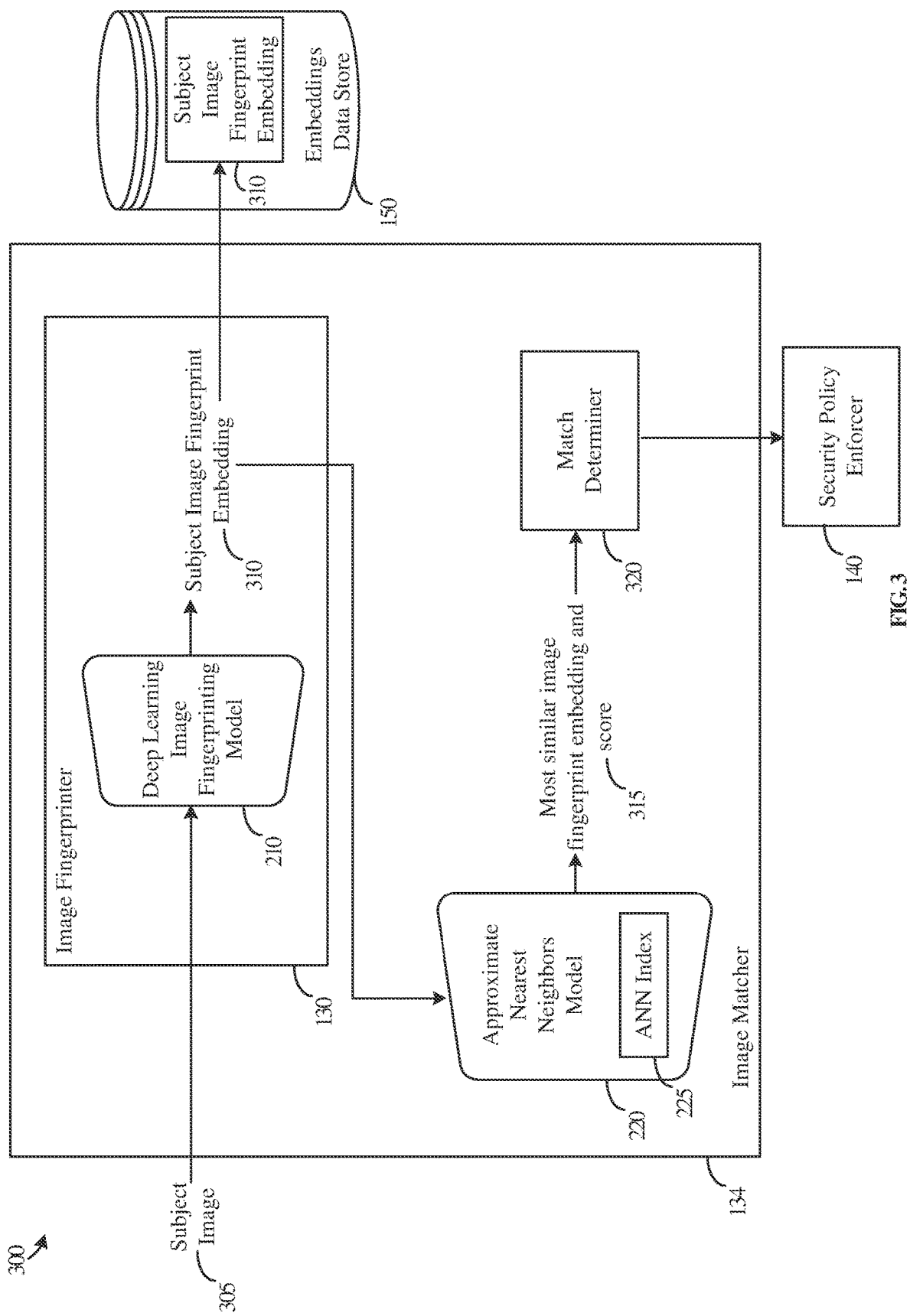
FIG. 3 illustrates a data flow for performing image matching, according to some embodiments.

FIG. 3 illustrates a data flow 300 for using the ANN model 220 and ANN index 225 by image matcher 134. Image matcher 134 receives subject image 305 for matching against image fingerprint embeddings 215. Image matcher 134 transmits subject image 305 to image fingerprinter 130. Image fingerprinter 130 inputs subject image 305 into deep learning image fingerprinting model 210 to generate subject image fingerprint embedding 310. In some embodiments, image matcher 134 transmits subject image fingerprint embedding 310 to embeddings data store 150 for storage. Image matcher 134 inputs subject image fingerprint embedding 310 into ANN model 220, which is trained to identify the most similar image fingerprint embedding in ANN index 225 to subject image fingerprint embedding 310 and generate a score representing the similarity. The score may represent a proportional mapping of an angular distance between the most similar image fingerprint embedding and subject image fingerprint embedding 310. The score, therefore, represents the differences between the two embeddings. ANN model 220 outputs the most similar image fingerprint embedding and score 315. Image matcher 134 uses match determiner 320 to determine whether subject image 305 is a match to the image used to generate the most similar image fingerprint embedding based on the score. For example, match determiner 320 may compare the score to a threshold value. If the score meets or exceeds the threshold value, match determiner 320 may identify subject image 305 as a match. If the score is below the threshold value, match determiner 320 may determine subject image 305 is not a match. Image matcher 134 may provide the determination from match determiner 320 with the subject image 305 to security policy enforcer 140. Security policy enforcer 140 may enforce a security policy on subject image 305 based on whether subject image 305 is a match (i.e., based on the score). For example, if subject image 305 is a match, security policy enforcer may apply a security policy relevant to images that are matches to the images for which image embeddings are in ANN index 225 as well as one or more other security policies. If subject image 305 is not a match, security policy enforcer 140 may not apply the security policy relevant to matches but instead a different one, others of the one or more other security policies that would be applied if subject image 305 were a match, or a combination.

Figure 4:
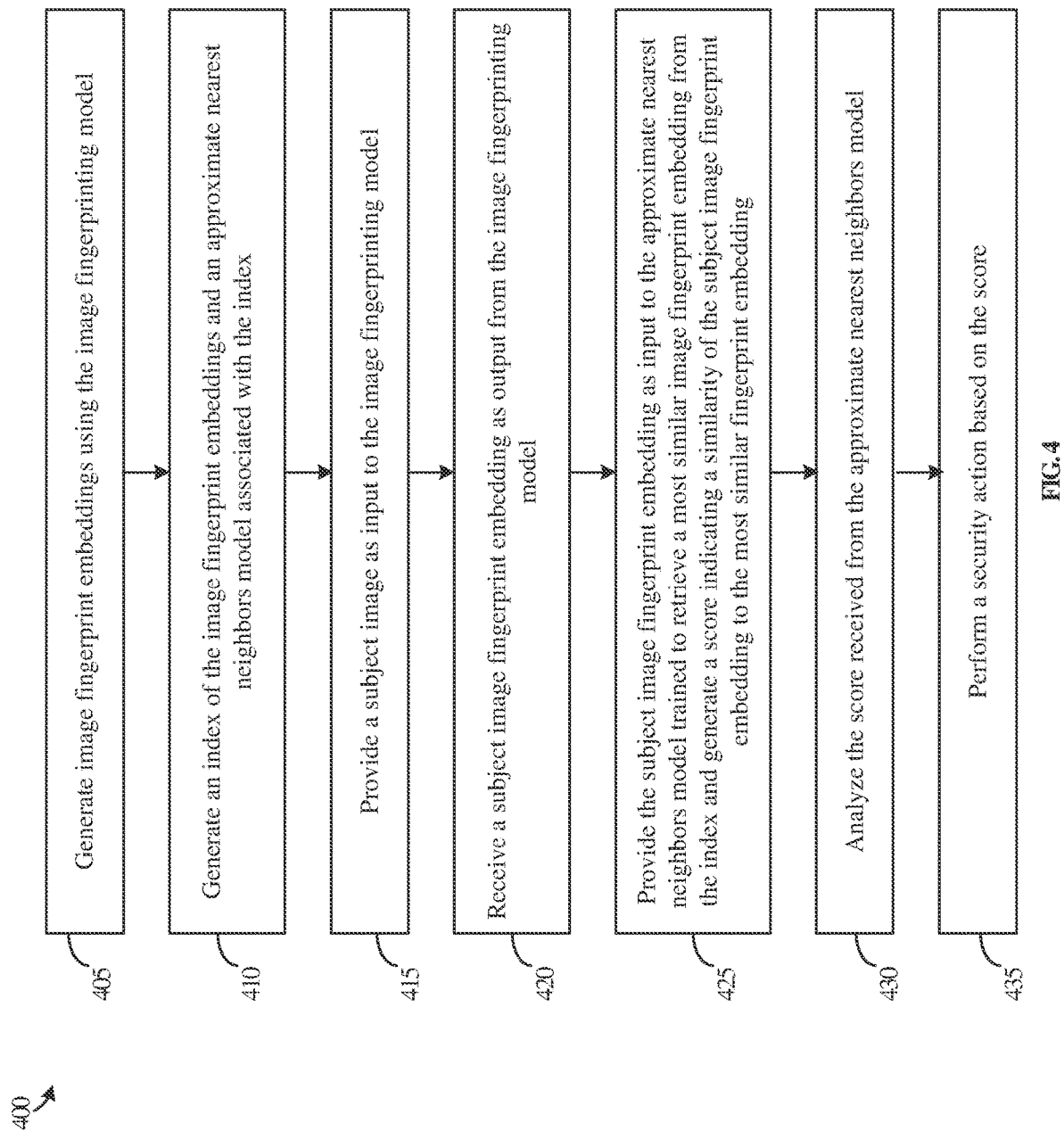
FIG. 4 illustrates a method of image matching in a network security system, according to some embodiments.

FIG. 4 illustrates a method 400 for image matching using a network security system such as network security system 125. Method 400 begins at 405 with generating image fingerprint embeddings using the image fingerprinting model. For example, image fingerprinter 130 may input training images into deep learning image fingerprinting model 210 to generate image fingerprint embeddings 215.

At 410, method 400 continues with generating an index of the image fingerprint embeddings and an approximate nearest neighbors model trained to use the index. For example, image fingerprinter 130 may send image fingerprint embeddings 215 to index and ANN model generator 132 to generate ANN index 225 and ANN model 220.

At 415, method 400 continues with providing a subject image as input to the image fingerprinting model. For example, image matcher 134 may receive subject image 305 and input it into image fingerprinter 130, which uses deep learning image fingerprinting model 210 to generate subject image fingerprint embedding 310.

At 420, method 400 continues with receiving a subject image fingerprint embedding as output from the image fingerprinting model. For example, image matcher 134 may receive the subject image fingerprint embedding 310 from deep learning image fingerprinting model 210.

At 425, method 400 continues with providing the subject image fingerprint embedding as input to the approximate nearest neighbors model trained to retrieve a most similar image fingerprint embedding from the index and generate a score indicating a similarity of the subject image fingerprint embedding to the most similar fingerprint embedding. For example, image matcher 134 inputs subject image fingerprint embedding 310 to the ANN model 220, which is trained to retrieve a most similar image fingerprint embedding from the ANN index 225 and generate a score.

At 430, method 400 continues with analyzing the score received from the approximate nearest neighbors model. For example, match determiner 320 analyzes the score from ANN model 220 to determine whether subject image fingerprint embedding 310 is a match to the most similar fingerprint embedding. In some embodiments, the score is compared to a threshold value. If the score meets or exceeds the threshold value, subject image fingerprint embedding 310 is determined a match, otherwise subject image fingerprint embedding 310 is determined no match.

At 435, method 400 continues with performing a security action based on the score. For example, image matcher 134 may send subject image 305 and an indication of whether it is a match to any images used to generate ANN index 225 to security policy enforcer 140. Security policy enforcer 140 may apply security policies to subject image 305 based on whether it is a match or not (i.e., based on the score). If subject image 305 is a match, different security policies may be applied than if it is not a match. In some embodiments, if subject image 305 is a match, a notification may be sent to an administrator, an activity (e.g., moving, sharing, uploading, downloading, or the like) being performed on subject image 305 may be blocked, or both. If subject image 305 is not a match, no message is sent, the activity is not blocked, or both.

The steps of method 400 may be performed in a different order than that described including some steps being performed in parallel, in some embodiments. Further, method 400 may include more or fewer steps than those described.

FIG. 5 illustrates example images having differing transformations that may be identified using image matcher 134. Image 505 may be the original image. Image 510 may be a transformation of image 505 in which image 505 is flipped. Image 515 is a cropping of image 505. Image 520 is image 505 transformed with a rotation. Each of image 510, image 515, and image 520 may be identified as a match to image 505 using image matcher 134. For example, image 505 may be one of the images in training images 205. An image embedding may be generated as one of image fingerprint embeddings 215 and used to generate ANN model 220 and ANN index 225. When any of image 510, image 515, or image 520 is input into image matcher 134 as a subject image, image fingerprinter 130 uses deep learning image fingerprinting model 210 to generate subject image fingerprint embedding 310, and ANN model 220 will identify the image embedding associated with image 505 from ANN index 225 as a match and provide a score. Match determiner 320 will identify image 505 as a match to any of image 510, image 515, and image 520.

Advantageously, image matcher 134 can identify transformations including cropping, rotation, color distortions, blurring, and the like.

Figure 6:
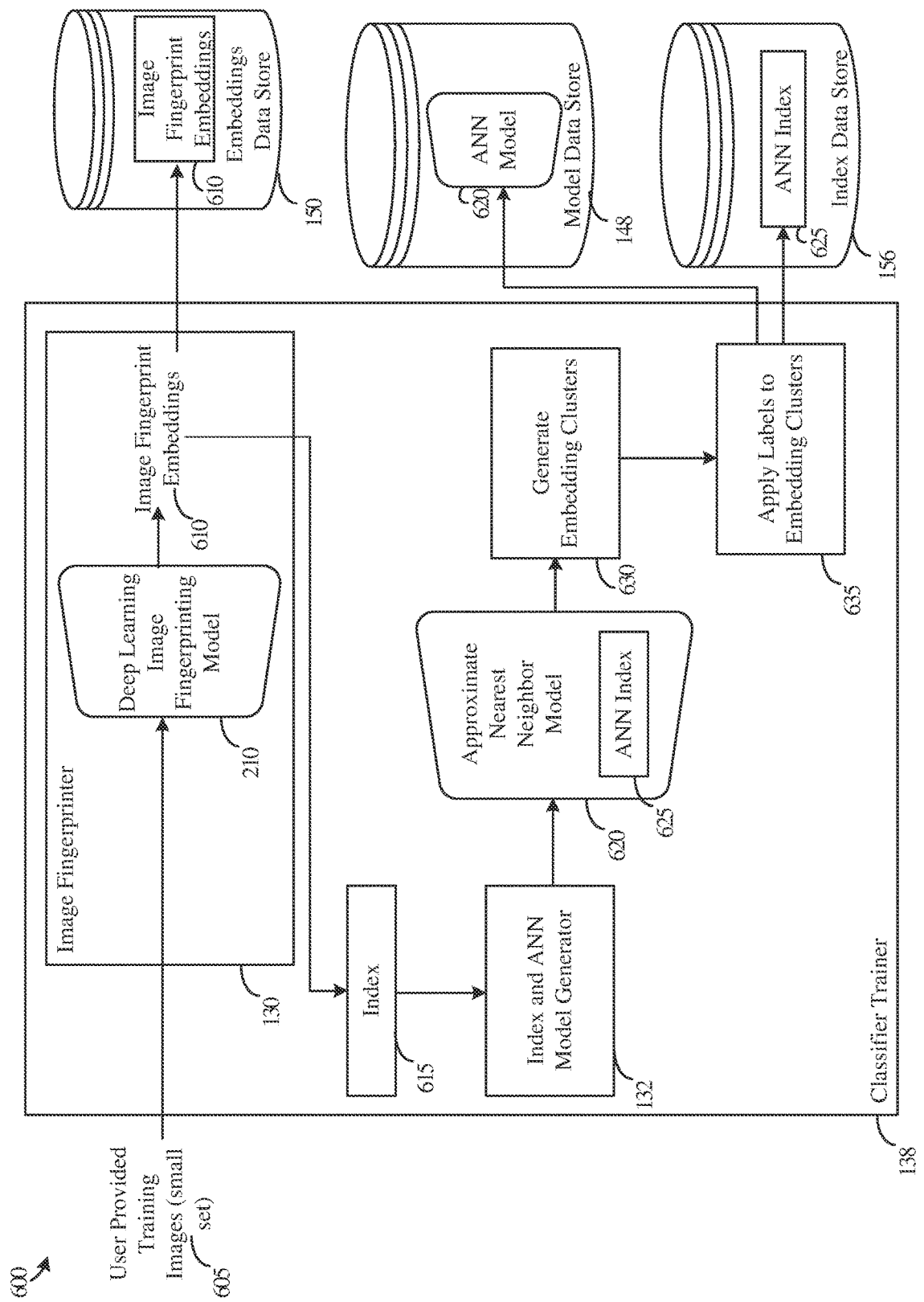
FIG. 6 illustrates a data flow for generating a user trained image classifier, according to some embodiments.

FIG. 6 illustrates a data flow 600 for training a classifier using a small data set quickly and efficiently without resorting to large data sets and retraining deep learning models like the deep learning image fingerprinting model. User provided training images 605 may be a small set of images including as few as twenty (20) images, though more images may be used to improve accuracy. User provided training images 605 may be obtained via a graphical user interface such as graphical user interface 1300 described with respect to FIG. 13 and may be stored in training data store 154 upon receipt. Training images 605 may be input into image fingerprinter 130. Image fingerprinter 130 inputs training images 605 into deep learning image fingerprinting model 210 to generate image fingerprint embeddings 610 from the images. Image fingerprint embeddings 610 may be stored in embeddings data store 150. Image fingerprint embeddings 610 may also be added to index 615. Index 615 may be a base index including negative image embeddings labeled with a default label (e.g., "other"), for example. Classifier trainer 138 may input image embeddings from index 615 plus the image fingerprint embeddings 610 to index and ANN model generator 132. Index and ANN model generator 132 may index the combined image fingerprint embeddings into ANN index 625 and train approximate nearest neighbors (ANN) model 620 to use ANN index 625 to identify the most similar image embedding from the combined image embeddings to an image embedding of a subject image embedding input into ANN model 620. Once ANN index 625 is generated and ANN model 620 is generated and trained, classifier trainer 138 generates embedding clusters (630) in ANN index 625 and applies labels to the embedding clusters 635. Specifically, image fingerprint embeddings 610 are clustered into a single embedding cluster and the user-defined label, provided with training images 605, is applied to the embedding cluster to form the cluster in embedding space. Other image embeddings in ANN index 625 are similarly clustered and labeled. Classifier trainer stores ANN model 620 into model data store 148 and ANN index 625 in index data store 156. They are now ready to be used by image classifier 136. Notably, generating ANN index 625 and ANN model 620 to use ANN index 625 is magnitudes of order faster than training a deep learning model, and the accuracy of the resulting classifications is comparable to an end-to-end deep learning classifier.

Figure 7:
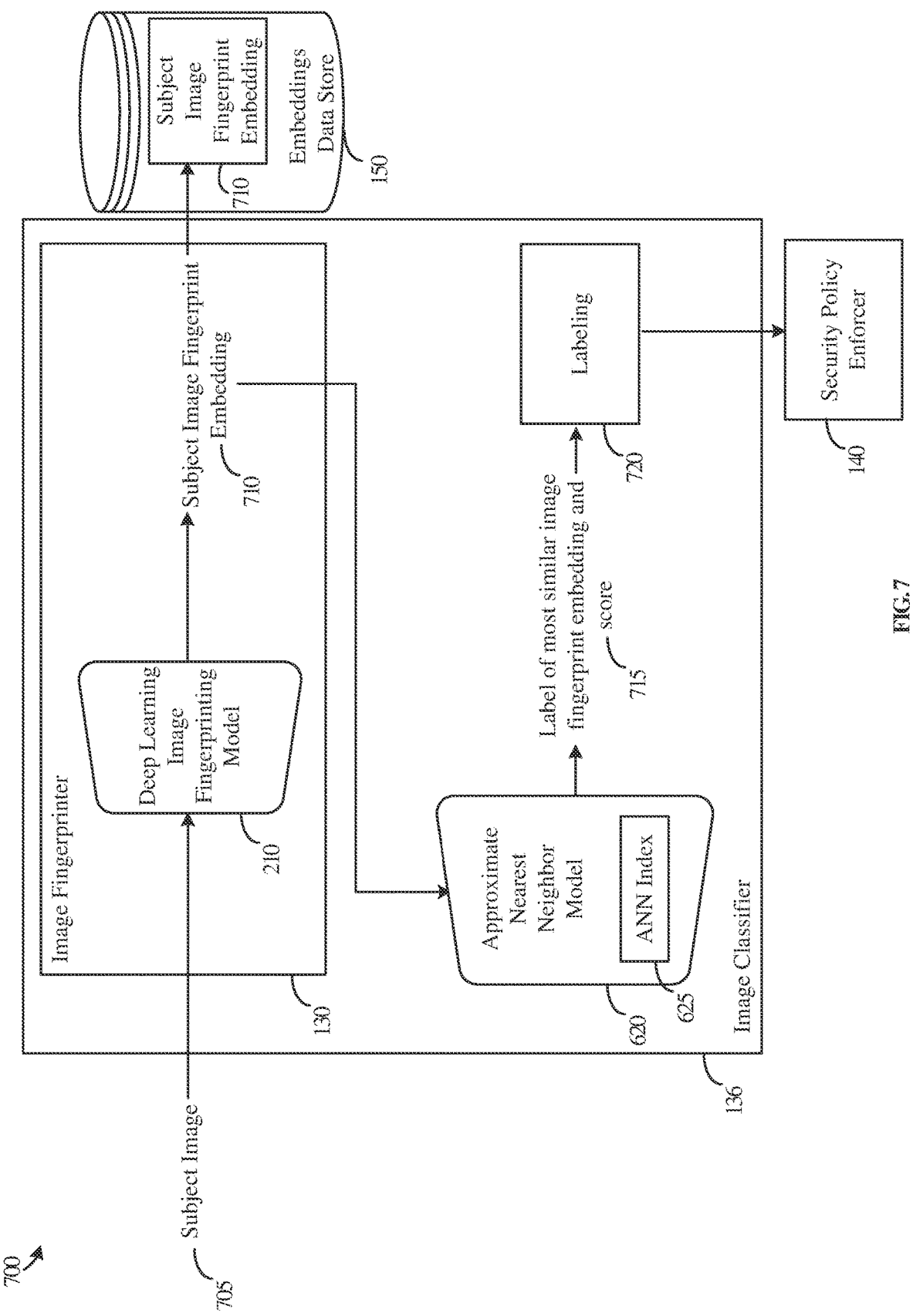
FIG. 7 illustrates a data flow for performing image classification, according to some embodiments.

FIG. 7 illustrates a data flow 700 for using the ANN model 620 and ANN index 625 by image classifier 136. Image classifier 136 receives subject image 705 for classifying based on the classifier trained with image fingerprint embeddings 610 (i.e., ANN index 625 and ANN model 620). Image classifier 136 transmits subject image 705 to image fingerprinter 130. Image fingerprinter 130 inputs subject image 705 into deep learning image fingerprinting model 210 to generate subject image fingerprint embedding 710. In some embodiments, image classifier 136 transmits subject image fingerprint embedding 710 to embeddings data store 150 for storage. Image classifier 136 inputs subject image fingerprint embedding 710 into ANN model 620, which is trained to identify the most similar image fingerprint embedding in ANN index 625 to subject image fingerprint embedding 710 and generate a score representing the similarity. The score may represent a normalized value of an angular distance between the most similar image fingerprint embedding and subject image fingerprint embedding 710. ANN model 620 outputs the label of the most similar image fingerprint embedding and score 715. Image classifier 136 uses labeling 720 to determine whether subject image 705 matches the image used to generate the most similar image fingerprint embedding closely enough based on the score to apply the label or classification to subject image 705. For example, labeling 720 may compare the score to a threshold value. If the score meets or exceeds the threshold value, labeling 720 may label subject image 705 with the returned label (i.e., class name). If the score is below the threshold value, labeling 720 may determine subject image 705 does not belong in the class and not apply the label. In some embodiments, a default label (e.g., "other") may be applied to subject image 705 if the score is below the threshold value. Image classifier 136 may provide subject image 705 with its designated label, based on the score, to security policy enforcer 140. Security policy enforcer 140 may enforce a security policy on subject image 705 based on the label, if any, applied to subject image 705 (i.e., based on the score). For example, if subject image 705 is labeled with the user-defined label, security policy enforcer may apply a security policy relevant to images that are classified in the user-defined class as well as one or more other security policies. If subject image 705 is labeled with the default label, security policy enforcer 140 may not apply the security policy relevant to the user-defined class but instead a different one, others of the one or more other security policies that would be applied if subject image 705 were in the user-defined class, or a combination.

Figure 8:
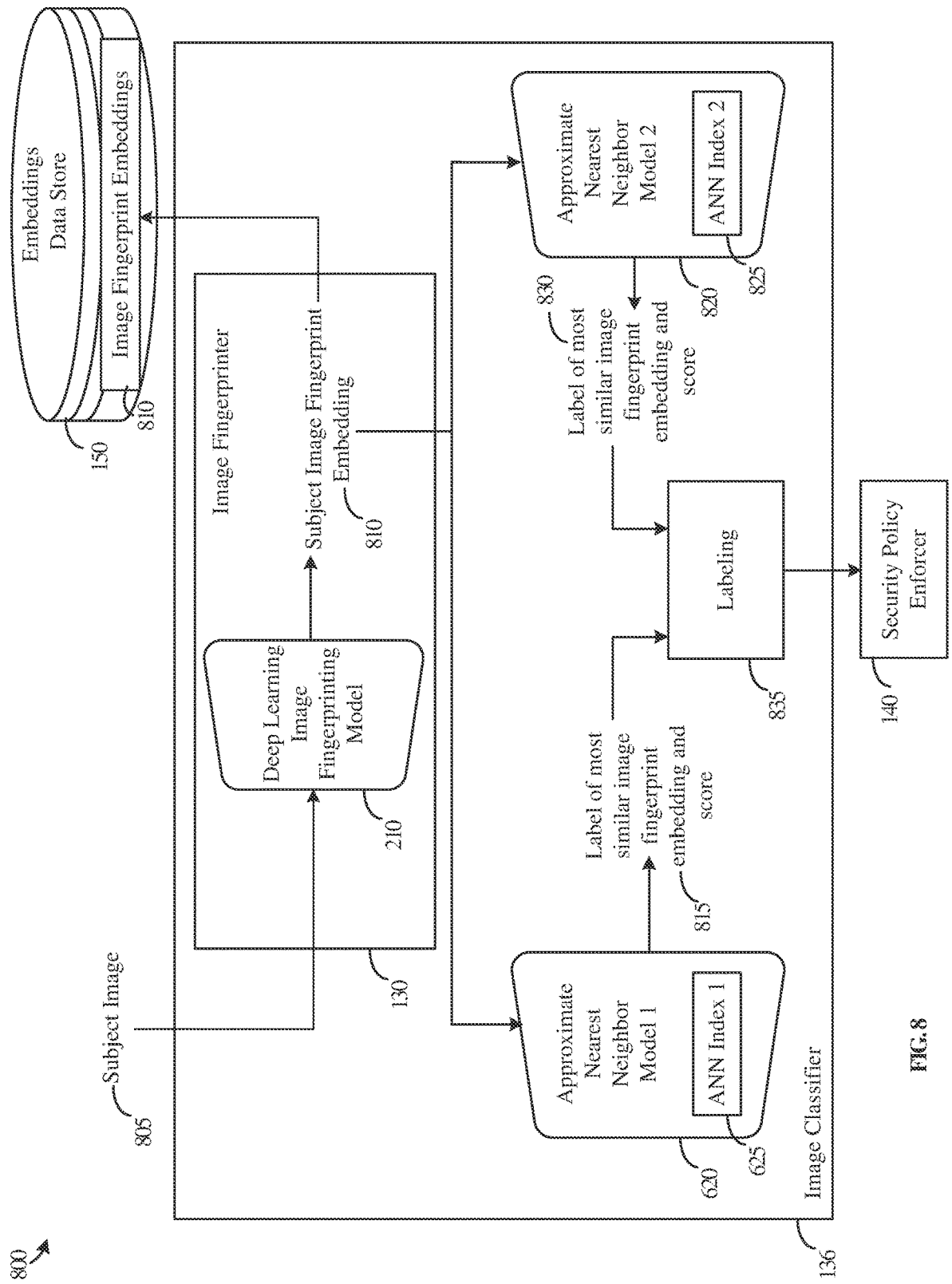
FIG. 8 illustrates a data flow for performing image classification with multiple user-trained classifiers, according to some embodiments.

FIG. 8 illustrates a data flow 800 for using the ANN model 620 and ANN index 625 as well as a second ANN model 820 and ANN index 825 by image classifier 136. For example, a user may train more than one classifier as described in FIG. 6. In some embodiments, the additional class may be added to the first index to generate a single ANN model and ANN index that may apply the first user-defined label or the second user-defined label depending on the input image. However, a user may wish to train image classifiers separately, allowing for labeling to occur differently depending on the resulting classifications.

Image classifier 136 receives subject image 805 for classifying. Image classifier 136 transmits subject image 805 to image fingerprinter 130. Image fingerprinter 130 inputs subject image 805 into deep learning image fingerprinting model 210 to generate subject image fingerprint embedding 810. In some embodiments, image classifier 136 transmits subject image fingerprint embedding 810 to embeddings data store 150 for storage. Image classifier 136 inputs subject image fingerprint embedding 810 into ANN model 620, which is trained to identify the most similar image fingerprint embedding in ANN index 625 to subject image fingerprint embedding 810 and generate a score representing the similarity. Additionally, image classifier 136 inputs subject image fingerprint embedding 810 into ANN model 820, which is trained to identify the most similar image fingerprint embedding in ANN index 825 to subject image fingerprint embedding 810 and generate a score representing the similarity. ANN model 620 and ANN index 625 may be a first user-defined classifier, and ANN model 820 and ANN index 825 may be a second user-defined classifier, for example. The scores output from each may represent a normalized value of an angular distance between the most similar image fingerprint embedding and subject image fingerprint embedding 810. ANN model 620 outputs the label of the most similar image fingerprint embedding and score 815. ANN model 820 outputs the label of the most similar image fingerprint embedding and score 830. Image classifier 136 uses labeling 835 to determine whether subject image 805 matches the image used to generate the most similar image fingerprint embedding from ANN model 620 and ANN index 625 closely enough based on the score to apply that label or classification to subject image 805. Image classifier 136 also uses labeling 835 to determine whether subject image 805 matches the image used to generate the most similar image fingerprint embedding from ANN model 820 and ANN index 825 closely enough based on the score to apply that label or classification to subject image 805. For example, labeling 835 may compare each score to a threshold value. In some embodiments, each ANN model may have a different threshold value for comparison, and accordingly each score is compared with its respective threshold value. If one score meets or exceeds the relevant threshold value, labeling 835 may label subject image 805 with the returned label (i.e., class name) having a score that exceeds the threshold. If each score is below the relevant threshold value, labeling 835 may determine subject image 805 does not belong in either class and not apply either label. In some embodiments, a default label (e.g., "other") may be applied to subject image 805 if each score is below the threshold value. Each score may meet or exceed the relevant threshold value in some scenarios. In that case, in some embodiments, labeling 835 may be configured to apply both labels to subject image 805. In other embodiments, labeling 835 may be configured to apply the label having the highest score to subject image 805. Image classifier 136 may provide subject image 805 with its designated label or labels, based on the scores, to security policy enforcer 140. Security policy enforcer 140 may enforce a security policy on subject image 705 based on the label, if any, applied to subject image 805 (i.e., based on the score). For example, if subject image 805 is labeled with one or more user-defined labels, security policy enforcer 140 may apply security policies relevant to images that are classified in the user-defined classes as well as one or more other security policies. If subject image 805 is labeled with the default label, security policy enforcer 140 may not apply the security policies relevant to the user-defined classes but instead different ones, others of the one or more other security policies that would be applied if subject image 805 were in the user-defined class, or a combination.

Figure 9:
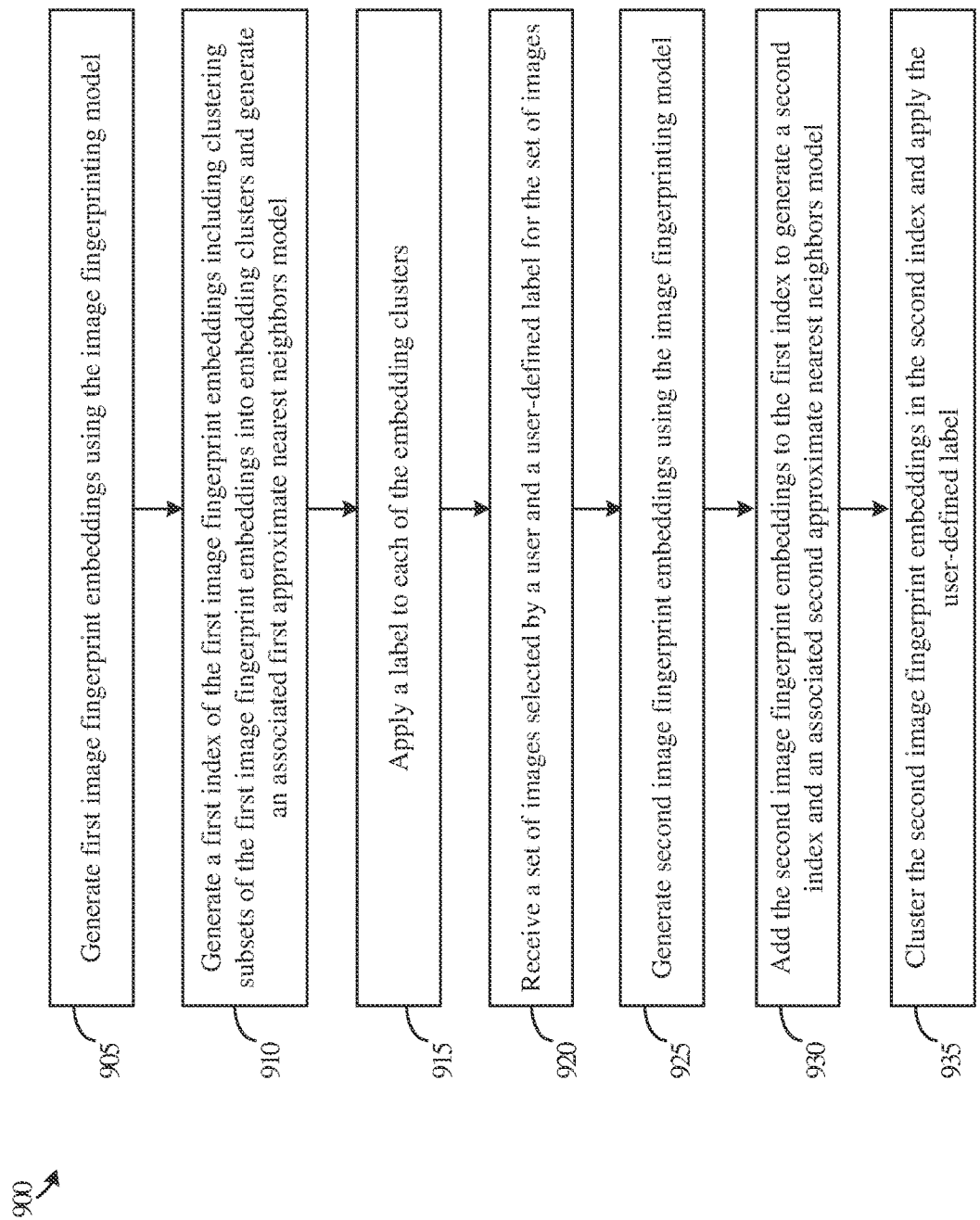
FIG. 9 illustrates a method of creating a user-trained image classifier and image classification in a network security system, according to some embodiments.

FIG. 9 illustrates a method 900 for image classification using a network security system such as network security system 125. Method 900 begins at 905 with generating first image fingerprint embeddings using the image fingerprinting model. For example, image fingerprinter 130 may input a set of base training images into deep learning image fingerprinting model 210 to generate image fingerprint embeddings.

At 910, method 900 continues with generating a first index of the first image fingerprint embeddings including clustering subsets of the first image fingerprint embeddings into embedding clusters and generate an associated first approximate nearest neighbors model trained to use the first index. For example, image fingerprinter 130 may send the first generated image fingerprint embeddings to index and ANN model generator 132 to generate a base index (index 615) and an associated ANN model. Classifier trainer 138 may generate embedding clusters (630) of index 615.

At 915, method 900 continues with applying a label to each of the embedding clusters. For example, classifier trainer 138 may apply labels to the embedding clusters (635).

At 920, method 900 continues with receiving a set of images selected by a user and a user-defined label for the set of images. For example, a user may provide a set of training images 605 and a user-defined label using graphical user interface 1300. Classifier trainer 138 may receive the user provided training images 605 and the user-defined label.

At 925, method 900 continues with generating second image fingerprint embeddings using the image fingerprinting model. For example, classifier trainer 138 inputs the user provided training images 605 into image fingerprinter 130. Image fingerprinter 130 provides the user provided training images 605 to deep learning image fingerprinting model 210 to generate image fingerprint embeddings 610.

At 930, method 900 continues with adding the second image fingerprint embeddings to the first index to generate a second index and an associated second approximate nearest neighbors model. For example, classifier trainer 138 adds image fingerprint embeddings 610 to the base index, index 615. Classifier trainer 138 provides the combined set of image fingerprint embeddings and provides them as input to index and ANN model generator 132. Index and ANN model generator 132 generates a new index (ANN index 625) of the combined image embeddings and an associated approximate nearest neighbors model (ANN model 620).

At 935, method 900 continues with clustering the second image fingerprint embeddings in the second index and apply the user-defined label. For example, classifier trainer 138 generates embedding clusters (630) and applies labels to the embedding clusters (635). For example, the user-defined label is applied to each of the image fingerprint embeddings 610 to generate the cluster in embedding space.

The steps of method 900 may be performed in a different order than that described including some steps being performed in parallel, in some embodiments. Further, method 900 may include more or fewer steps than those described.

Figure 10:
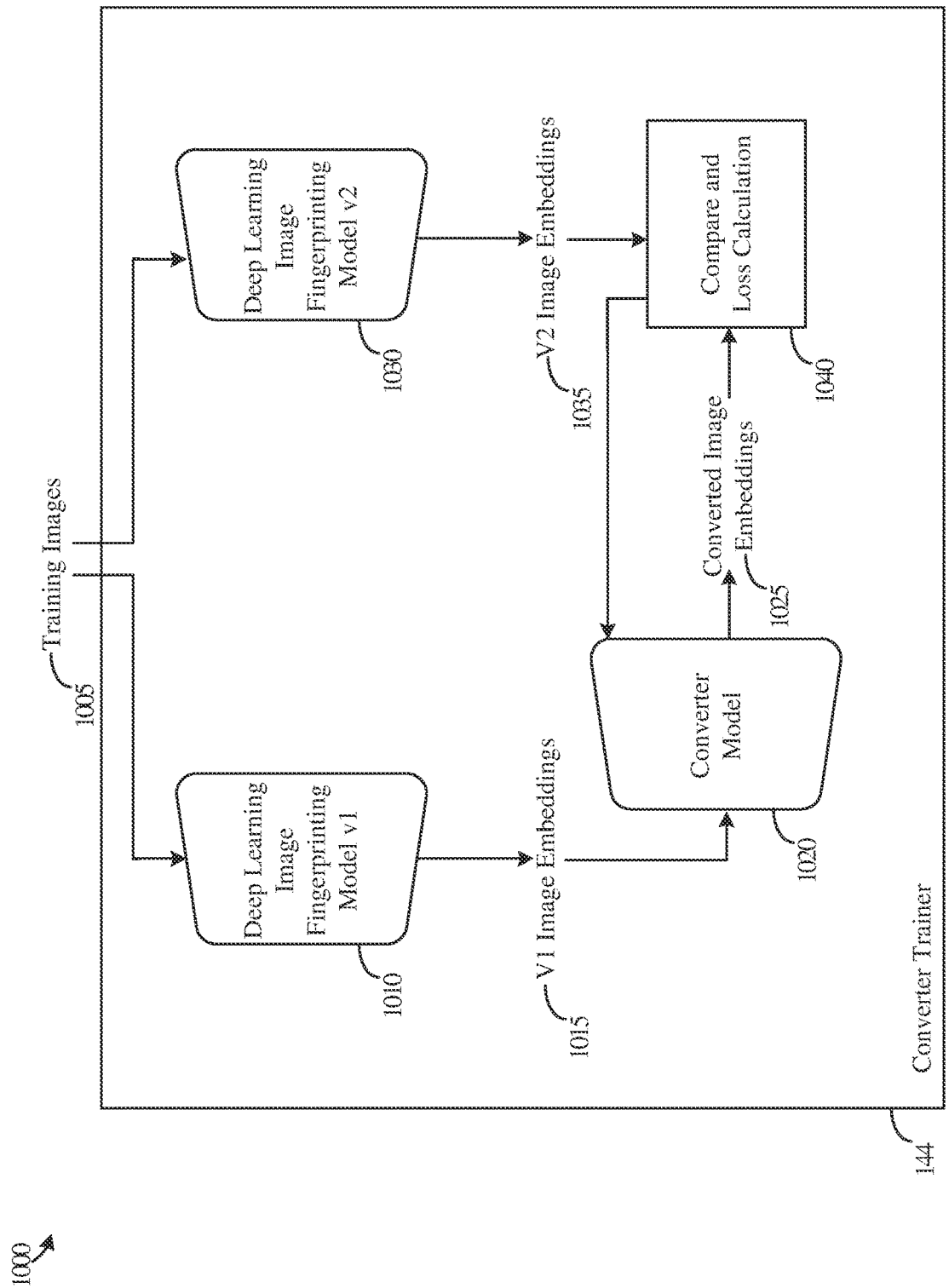
FIG. 10 illustrates a data flow for training an image embedding converter model, according to some embodiments.

FIG. 10 illustrates a data flow 1000 for converter trainer 144 to train a converter model 1020 to convert image embeddings generated by a first deep learning image fingerprinting model 1010 to image embeddings compatible with image embeddings generated by a second deep learning image fingerprinting model 1030. In some cases, for example, a first deep learning image fingerprinting model 1010, which may be a first version, may need to be retrained or otherwise updated, which results in the second deep learning image fingerprinting model 1030. Once modified, the image embeddings generated by the second deep learning image fingerprinting model 1030 will not be compatible with the image embeddings generated by the first deep learning image fingerprinting model 1010. In some embodiments, the first deep learning image fingerprinting model 1010 and the second deep learning image fingerprinting model 1030 are not different versions of the same model but are completely different image fingerprinting models. In either case, since the resulting image embeddings are not compatible, old image embeddings generated by the first deep learning image fingerprinting model 1010 will need to be converted to be compatible or replaced with image embeddings generated by the second deep learning image fingerprinting model 1030. Conversion may be the only option if the original images are not available for generating new image embeddings. Both the first deep learning image fingerprinting model 1010 and the second deep learning image fingerprinting model 1030 may be fingerprinting models as described with respect to FIG. 1 in which they generate semantically rich, multi-dimensional feature vectors representing the visual aspects of the input image.

To train converter model 1020, a set of training images 1005 may be obtained from training data store 154. Training images 1005 may be different images than those used to train the first deep learning image fingerprinting model 1010 and different than those used to train the second deep learning image fingerprinting model 1030. Training images 1005 are input into the first deep learning image fingerprinting model 1010 to generate V1 image embeddings 1015. Training images 1005 are also input into the second deep learning image fingerprinting model 1030 to generate V2 image embeddings 1035. V1 image embeddings 1015 are input into converter model 1020 to generate converted image embeddings 1025. The converted image embeddings 1025 are compared with V2 image embeddings 1035 to calculate a loss using compare and loss calculation 1040. The loss is backpropagated into converter model 1020 to train converter model 1020. When training is complete, converter model 1020 will generate converted image embeddings 1025 that are compatible with V2 image embeddings 1035. The comparison may use Mean Square Error to calculate the loss.

Figure 11:
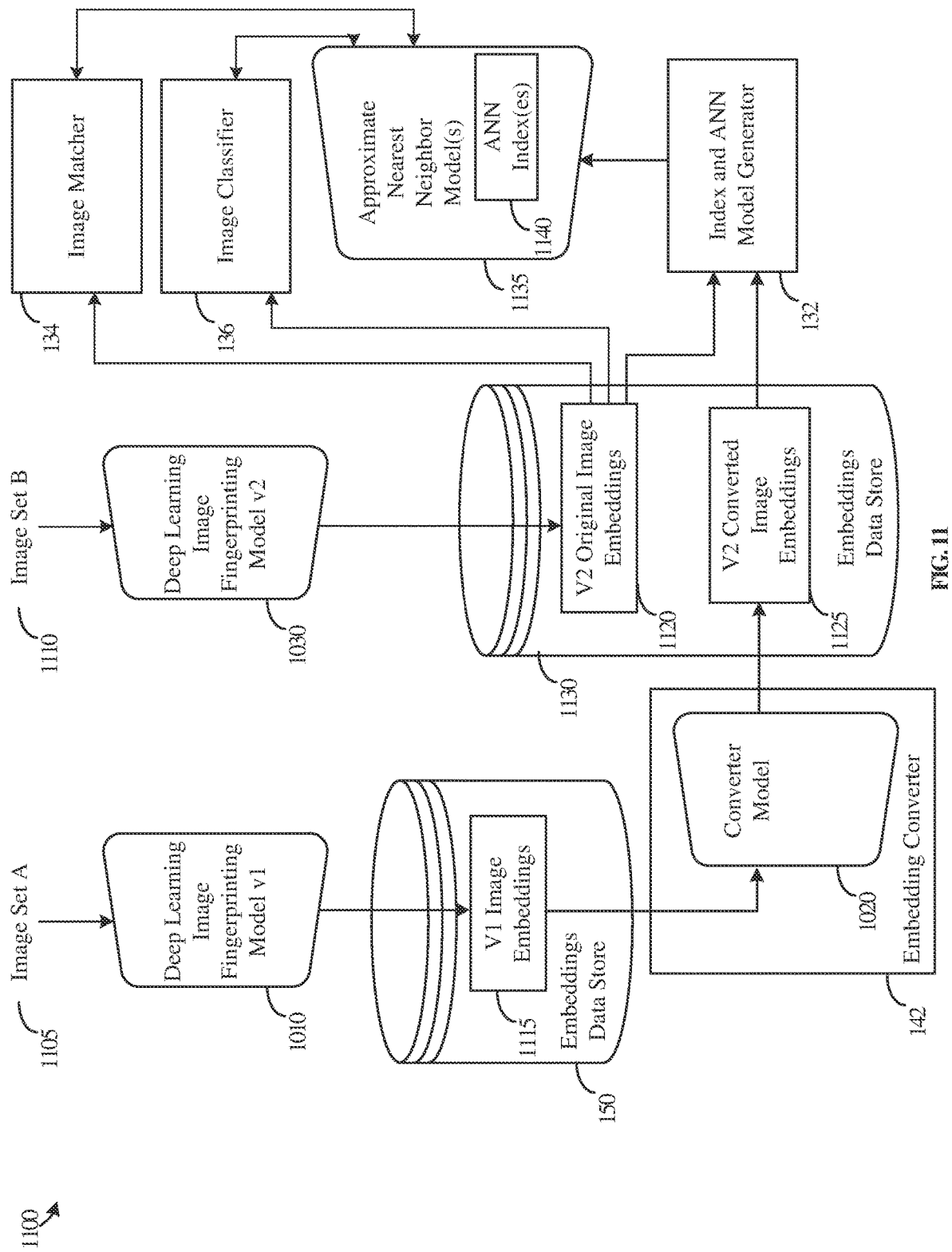
FIG. 11 illustrates a data flow for converting image embeddings with a converter model, according to some embodiments.

FIG. 11 illustrates a data flow 1100 for converting a network security system such as network security system 125 from using the first deep learning image fingerprinting model 1010 to using the second deep learning image fingerprinting model 1030 after converter model 1020 is trained.

In prior use, image set A 1105 was used to generate V1 image embeddings 1115 stored in embeddings data store 150. Once second deep learning image fingerprinting model 1030 is ready to use, embedding converter 142 access the V1 image embeddings 1115 and inputs them into converter model 1020 to generate V2 converted image embeddings 1125 and store them in embeddings data store 1130. Any new images are in image set B 1110 which are fingerprinted by second deep learning image fingerprinting model 1030 to generate V2 original image embeddings 1120. V2 original image embeddings 1120 and V2 converted image embeddings are stored in embeddings data store 1130, which may be separate from or the same as embeddings data store 150.

Sets of image embeddings from V2 original image embeddings 1120 and V2 converted image embeddings are input into index and ANN model generator 132 to generate various ANN models 1135 and associated ANN indexes 1140. Because the V2 converted image embeddings 1125 are compatible with V2 original image embeddings 1120, these generated ANN indexes 1140 and associated ANN models 1135 will accurately identify the most similar image embedding in the relevant ANN index 1140 when prompted with a subject image embedding. Accordingly, new V2 original image embeddings 1120 generated from a subject image can be used by image matcher 134 and image classifier 136 to access relevant ANN models 1135 for matching and classification, respectively.

FIG. 12 illustrates a method 1200 for training a converter model (e.g., converter model 1020. Method 1200 begins at 1205 with generating first image fingerprint embeddings for a set of images using the first image fingerprinting model. For example, training images 1005 are provided to converter trainer 144, and converter trainer 144 inputs the training images 1005 into the first deep learning image fingerprinting model 1010 to generate V1 image embeddings 1015.

At 1210, method 1200 continues with generating second image fingerprint embeddings for the set of images using the second image fingerprinting model. For example, converter trainer 144 inputs the training images 1005 into the second deep learning image fingerprinting model 1030 to generate V2 image embeddings 1035.

At 1215 method 1200 continues with providing a first image fingerprint embedding associated with an image of the set of images as input to the converter model. For example, converter trainer 144 takes a first of V1 image embeddings 1015 and inputs it into converter model 1020.

At 1220 method 1200 continues with receiving a converted image fingerprint embedding from the converter model. For example, converter model 1020 generates a converted image embedding 1025 in response to the input V1 image embedding 1015. Each of the V1 image embeddings 1015 are analyzed individually.

At 1225 method 1200 continues with comparing the converted output image fingerprint embedding with the second image fingerprint embedding associated with the image to calculate a loss. For example, compare and loss calculation 1040 compares the converted image embedding 1025 with the V2 image embedding 1035 that corresponds to the same training image 1005. Compare and loss calculation 1040 calculates the loss. For example, the comparison may use Mean Square Error to calculate the loss.

At 1230 method 1200 continues with backpropagating the loss through the converter model. For example, compare and loss calculation 1040 may backpropagate the calculated loss to converter model 1020.

At 1235, method 1200 continues with determining whether there are more images in the set of images. If so, the next image is analyzed by repeating steps 1215, 1220, 1225, and 1235 (e.g., by converting the image embedding with the converter model, calculating the loss, and backpropagating the loss through the converter model). The repetition continues until no more images are in the set of images and training is complete at 1240.

The steps of method 1200 may be performed in a different order than that described including some steps being performed in parallel, in some embodiments. Further, method 1200 may include more or fewer steps than those described.

FIG. 13 illustrates an exemplary graphical user interface 1300. Graphical user interface 1300 may be provided via user interface 146 to allow a user to train a new classifier. Other graphical user interfaces may be used to allow a user to configure settings such as setting the threshold values used for matching, configuring security policies, and the like.

Graphical user interface 1300 provides text box 1305 for a user to enter a classifier name (i.e., a user-defined label). The user can set the training files to positive training data using radio option 1310. The user can set the training files to negative training data using radio option 1315. Negative training data may be assigned a default class name and used to further train the classifier. Negative training data is used to add to an index as described with respect to FIG. 6, but the newly added image embeddings will be given the default label with other negative training data.

The user may drag and drop or otherwise indicate a location of the image files using entry box 1320. As few as twenty (20) image files may be provided to train a classifier with the user-defined label (i.e., classifier name).

The user may use slider 1325 to set a percent match, which is used as the threshold value by labeling 720 and labeling 835. The default may be any value, though depicted as eighty-five percent (85%). Once the information is entered and submitted using submit button 1330, classifier trainer 138 can use the information to train the classifier, for example as described with respect to data flow 600 of FIG. 6.

Figure 14:
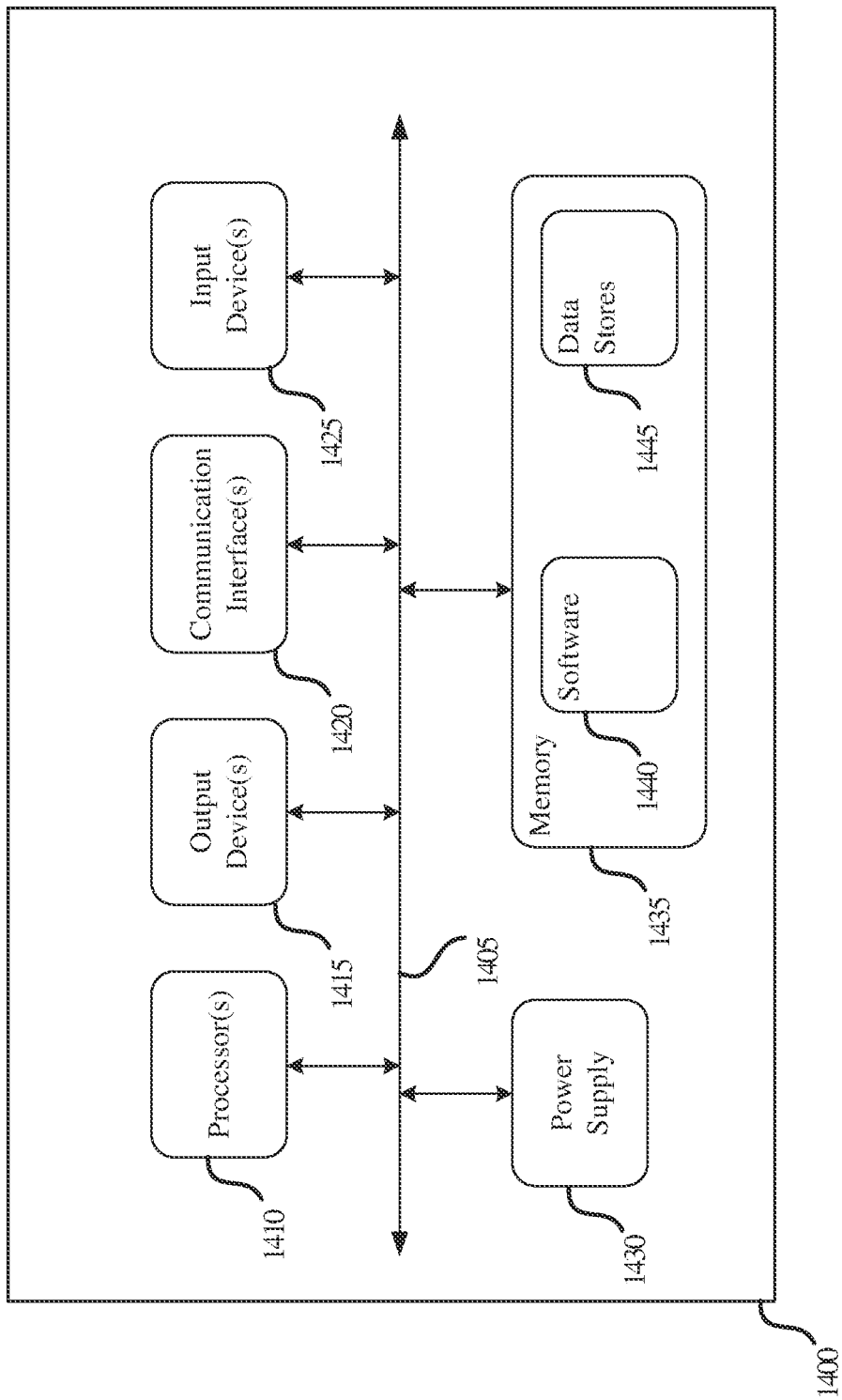
FIG. 14 illustrates an exemplary computing system, according to some embodiments.

FIG. 14 illustrates a computing device 1400. The computing device 1400 includes various components not included for ease of description in other computing devices discussed herein including, for example, endpoints 105, network security system 125, and hosted services 120. Accordingly, computing device 1400 may be endpoints 105, network security system 125, or hosted services 120 by incorporating the functionality described in each.

Computing device 1400 is suitable for implementing processing operations described herein related to security enforcement, image fingerprinting, image matching, image classification, and image embedding conversion, with which aspects of the present disclosure may be practiced. Computing device 1400 may be configured to implement processing operations of any component described herein including the user system components (e.g., endpoints 105 of FIG. 1). As such, computing device 1400 may be configured as a specific purpose computing device that executes specific processing operations to solve the technical problems described herein including those pertaining to security enforcement, image fingerprinting, image matching, image classification, and image embedding conversion. Computing device 1400 may be implemented as a single apparatus, system, or device or may be implemented in a distributed manner as multiple apparatuses, systems, or devices. For example, computing device 1400 may comprise one or more computing devices that execute processing for applications and/or services over a distributed network to enable execution of processing operations described herein over one or more applications or services. Computing device 1400 may comprise a collection of devices executing processing for front-end applications/services, back-end applications/services, or a combination thereof. Computing device 1400 includes, but is not limited to, a bus 1405 communicably coupling processors 1410, output devices 1415, communication interfaces 1420, input devices 1425, power supply 1430, and memory 1435.

Non-limiting examples of computing device 1400 include smart phones, laptops, tablets, PDAs, desktop computers, servers, blade servers, cloud servers, smart computing devices including television devices and wearable computing devices including VR devices and AR devices, e-reader devices, gaming consoles and conferencing systems, among other non-limiting examples.

Processors 1410 may include general processors, specialized processors such as graphical processing units (GPUs) and digital signal processors (DSPs), or a combination. Processors 1410 may load and execute software 1440 from memory 1435. Software 1440 may include one or more software components such as image fingerprinter 130, index and ANN model generator 132, image matcher 134, image classifier 136, classifier trainer 138, security policy enforcer 140, embedding converter 142, converter trainer 144, user interface 146, endpoint routing client 110, or any combination including other software components. In some examples, computing device 1400 may be connected to other computing devices (e.g., display device, audio devices, servers, mobile/remote devices, VR devices, AR devices, etc.) to further enable processing operations to be executed. When executed by processors 1410, software 1440 directs processors 1410 to operate as described herein for at least the various processes, operational scenarios, and sequences discussed in the foregoing implementations. Computing device 1400 may optionally include additional devices, features, or functionality not discussed for purposes of brevity. For example, software 1440 may include an operating system that is executed on computing device 1400. Computing device 1400 may further be utilized as endpoints 105 or any of the cloud computing systems in system 100 (FIG. 1) including network security system 125 or may execute the method 400 of FIG. 4, method 900 of FIG. 9, method 1200 of FIG. 12, or any combination.

Referring still to FIG. 14, processors 1410 may include a processor or microprocessor and other circuitry that retrieves and executes software 1440 from memory 1435. Processors 1410 may be implemented within a single processing device but may also be distributed across multiple processing devices or sub-systems that cooperate in executing program instructions. Examples of processors 1410 include general purpose central processing units, microprocessors, graphical processing units, application specific processors, sound cards, speakers and logic devices, gaming devices, VR devices, AR devices as well as any other type of processing devices, combinations, or variations thereof.

Memory 1435 may include any computer-readable storage device readable by processors 1410 and capable of storing software 1440 and data stores 1445. Data stores 1445 may include model data store 148, embedding data store 150, security policy data store 152, training data store 154, and index data store 156. Memory 1435 may include volatile and nonvolatile, removable and non-removable media implemented in any method or technology for storage of information, such as computer readable instructions, data structures, program modules, cache memory, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer-readable storage device a propagated signal.

In addition to computer-readable storage devices, in some implementations, memory 1435 may also include computer-readable communication media over which at least some of software 1440 may be communicated internally or externally. Memory 1435 may be implemented as a single storage device but may also be implemented across multiple storage devices or sub-systems co-located or distributed relative to each other. Memory 1435 may include additional elements, such as a controller, capable of communicating with processors 1410 or possibly other systems.

Software 1440 may be implemented in program instructions and among other functions may, when executed by processors 1410, direct processors 1410 to operate as described with respect to the various operational scenarios, sequences, and processes illustrated herein. For example, software 1440 may include program instructions for executing image fingerprinting, image matching, image classifying, image embedding conversion, or security policy enforcement as described herein.

In particular, the program instructions may include various components or modules that cooperate or otherwise interact to conduct the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1440 may include additional processes, programs, or components, such as operating system software, virtual machine software, or other application software. Software 1440 may also include firmware or some other form of machine-readable processing instructions executable by processors 1410.

In general, software 1440 may, when loaded into processors 1410 and executed, transform a suitable apparatus, system, or device (of which computing device 1400 is representative) overall from a general-purpose computing system into a special-purpose computing system customized to execute specific processing components described herein as well as process data and respond to queries. Indeed, encoding software 1440 on memory 1435 may transform the physical structure of memory 1435. The specific transformation of the physical structure may depend on various factors in different implementations of this description. Examples of such factors may include, but are not limited to, the technology used to implement the storage media of memory 1435 and whether the computer-storage media are characterized as primary or secondary storage, as well as other factors.

For example, if the computer readable storage device are implemented as semiconductor-based memory, software 1440 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interfaces 1420 may include communication connections and devices that allow for communication with other computing systems (not shown) over communication networks (not shown). Communication interfaces 1420 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication interfaces 1420 may also include associated user interface software executable by processors 1410 in support of the various user input and output devices discussed below. Separately or in conjunction with each other and other hardware and software elements, the user interface software and user interface devices may support a graphical user interface, a natural user interface, or any other type of user interface, for example, that enables front-end processing and including rendering of user interfaces, such as a user interface that is used by a user on endpoint 105. Exemplary applications/services may further be configured to interface with processing components of computing device 1400 that enable output of other types of signals (e.g., audio output, handwritten input) in conjunction with operation of exemplary applications/services (e.g., a collaborative communication application/service, electronic meeting application/service, etc.) described herein.

Input devices 1425 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices 1415 may include a display, speakers, haptic devices, and the like. In some cases, the input and output devices may be combined in a single device, such as a display capable of displaying images and receiving touch gestures. The aforementioned user input and output devices are well known in the art and need not be discussed at length here.

Communication between computing device 1400 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

The computing device 1400 has a power supply 1430, which may be implemented as one or more batteries. The power supply 1430 may further include an external power source, such as an AC adapter or a powered docking cradle that supplements or recharges the batteries. In some embodiments, the power supply 1430 may not include batteries and the power source may be an external power source such as an AC adapter.

Figure 15:
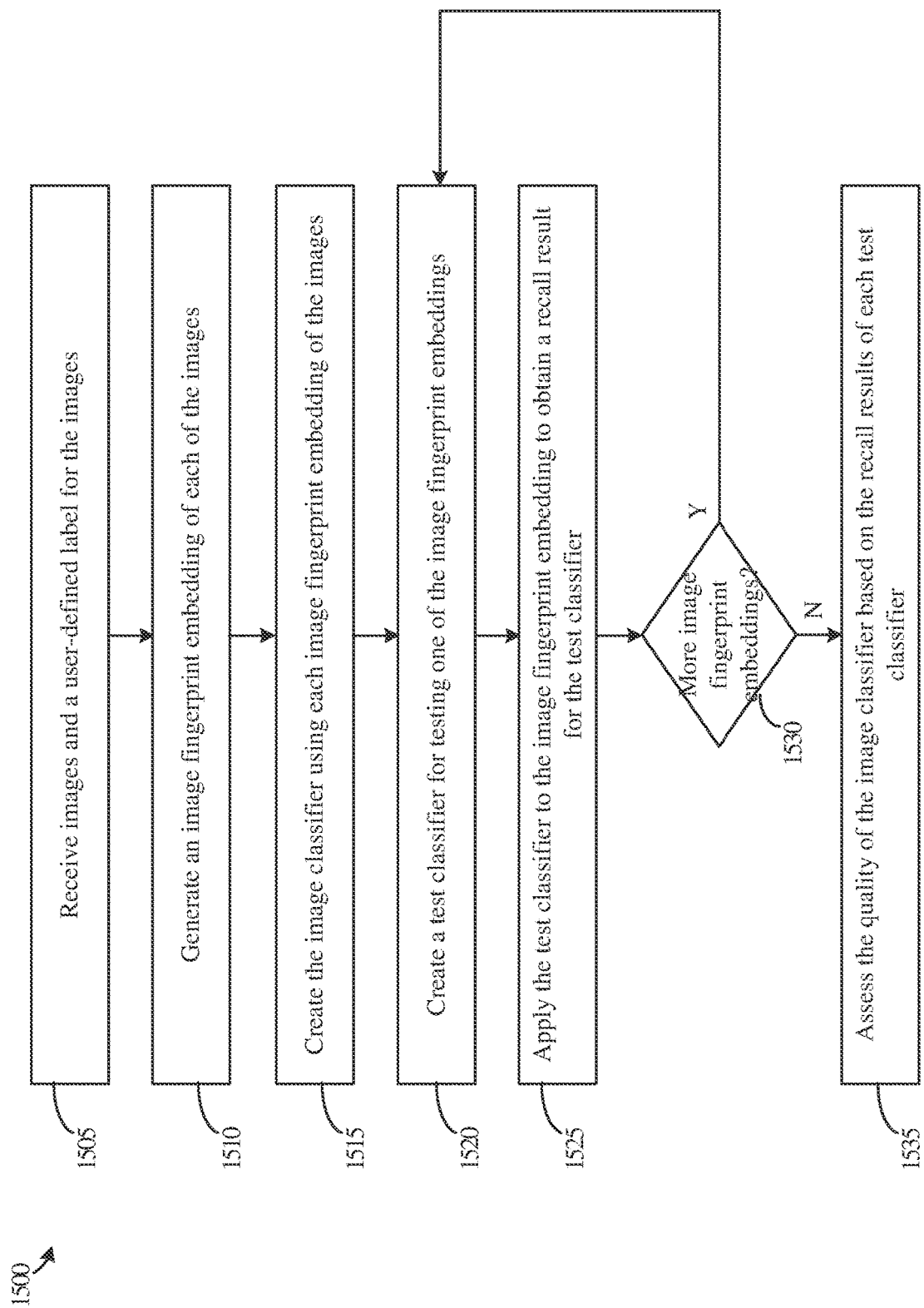
FIG. 15 illustrates a method of testing an image classifier, according to some embodiments.

FIG. 15 illustrates method 1500 of testing an image classifier. For example, for a user-defined image classifier, upon generating the image classifier, fast and efficient testing can be used to provide immediate indications to the user about the quality of the user-defined classifier. Method 1500 may be performed by network security system 125. While the steps of method 1500 are depicted in a given order, some steps may be performed multiple times, in a different order, and the like without departing from the scope and spirit of this disclosure.

Method 1500 may begin at step 1505 with receiving images and a user-defined label for the images. For example, the user may use user interface 1300 to provide a set of images representing a class that the user would like to use to train an image classifier for classifying future images. The user may also enter a classifier name used to label images classified into the class by the image classifier.

At step 1510, an image fingerprint embedding is generated for each image. For example, classifier trainer 138 may submit the images to image fingerprinter 130 to generate an image fingerprint (i.e., image embedding) of the image. Each image fingerprint may be a vector representing visual features of the respective image.

At step 1515, the image classifier is created using each image fingerprint embedding of the images. For example, classifier trainer 138 may receive the image embeddings from image fingerprinter 130 and submit the image embeddings to index and ANN model generator 132 to generate the index and associated ANN model for the image classifier. The image fingerprint embeddings used to train the image classifier are grouped into an embedding cluster in the index and the user-defined label is applied to the embedding cluster. When complete the image classifier is trained such that the ANN model retrieves the most similar image embedding from the associated index when provided an image embedding as input. The ANN model obtains the label applied to the image embedding (e.g., based on the embedding cluster to which the most similar image embedding belongs) and provides the label and a score representing a similarity between the most similar image embedding and the input image embedding as output. In some embodiments, step 1515 does not happen until the quality of the image classifier is calculated and the user confirms the quality. Such confirmation is discussed in further detail with respect to FIG. 18.

At step 1520, classifier testing and outlier detector 158 creates a test classifier for testing one of the image fingerprint embeddings. For example, classifier trainer 138 may provide the image embeddings to classifier testing and outlier detector 158. Classifier testing and outlier detector 158 may hold one image fingerprint embedding back as a test embedding and submit the remaining image embeddings to classifier trainer 138 to generate a test classifier. Classifier trainer 138 may use index and ANN model generator 132 to create the testing index and associated testing ANN model using the remaining image embeddings and return the testing index and associated testing ANN model to classifier testing and outlier detector 158.

At step 1525, the test classifier can be applied to the image fingerprint embedding held back as the test embedding. For example, classifier testing and outlier detector 158 may submit the test embedding and an indication of the test classifier (i.e., the testing index and associated ANN model) to image classifier 136. Image classifier 136 may submit the test embedding to the testing ANN model to receive the label of the most similar image embedding in the testing index and a score representing the similarity between the most similar image embedding and the test embedding. Image classifier 136 may determine whether to apply the label to the test embedding based on the score and the threshold value set for the test image classifier. Image classifier 136 may apply a default or negative value to the image if the returned label is not applied based on the score. Image classifier 136 may return the indication of the determined label to classifier testing and outlier detector 158. Classifier testing and outlier detector 158 may compare the label with the known value to calculate a recall value for the test image classifier. In some embodiments, classifier testing and outlier detector 158 additionally applies the test image classifier to negative image embeddings, for example, by submitting each negative image embedding to image classifier 136 for classification by the testing ANN model. The results of all submitted embeddings for the test image classifier are used to calculate a recall value, a precision value, a false positive value, a true positive value, a true negative value, a false negative value, or any combination thereof.

At decision 1530, classifier testing and outlier detector 158 determines whether there are more image fingerprint embeddings that have not been used as a test embedding in a testing iteration. If so, steps 1520 and 1525 are repeated for each remaining image fingerprint embedding until they have each been used as a test embedding in one testing iteration. Once the answer at decision block 1530 is "no" because all image fingerprint embeddings have been used in a testing iteration, method 1500 moves to step 1535.

At step 1535 the quality of the image classifier is assessed based on the recall results of each testing classifier. For example, classifier testing and outlier detector 158 may calculate an average recall value using each recall value calculated at each testing iteration. The average recall value may be compared to a threshold value to determine the quality of the image classifier. For example, when the average recall value is ninety percent or higher, the image classifier may be determined high quality; when the average recall value is between seventy five percent and ninety percent, the image classifier may be determined good quality; and when the average recall value is seventy five percent or less, the image classifier may be determined low quality. In some embodiments, other values than the recall value may be used to determine the quality. For example, the false positive value, the precision value, or any other value obtained in each testing iteration may be used alone or in combination (e.g., a weighted, combined score) to calculate an average value based on values from each testing iteration. The average value may be compared to a threshold value or range of values to assess the quality.

In some embodiments, once the quality is assessed, the determined quality may be provided to the user nearly instantly (e.g., within seconds or minutes of image upload) such that the user may make changes so that a new image classifier can be trained and tested immediately for use by the user, or the user can use the image classifier with the given quality. In some embodiments, the quality of the image classifier can be considered by network security system 125 and particularly by security policy enforcer 140 when applying security policies. For example, low quality image classifiers may be associated with lower severity scores that may be used to determine which or how security policies are applied by security policy enforcer 140.

Figure 16:
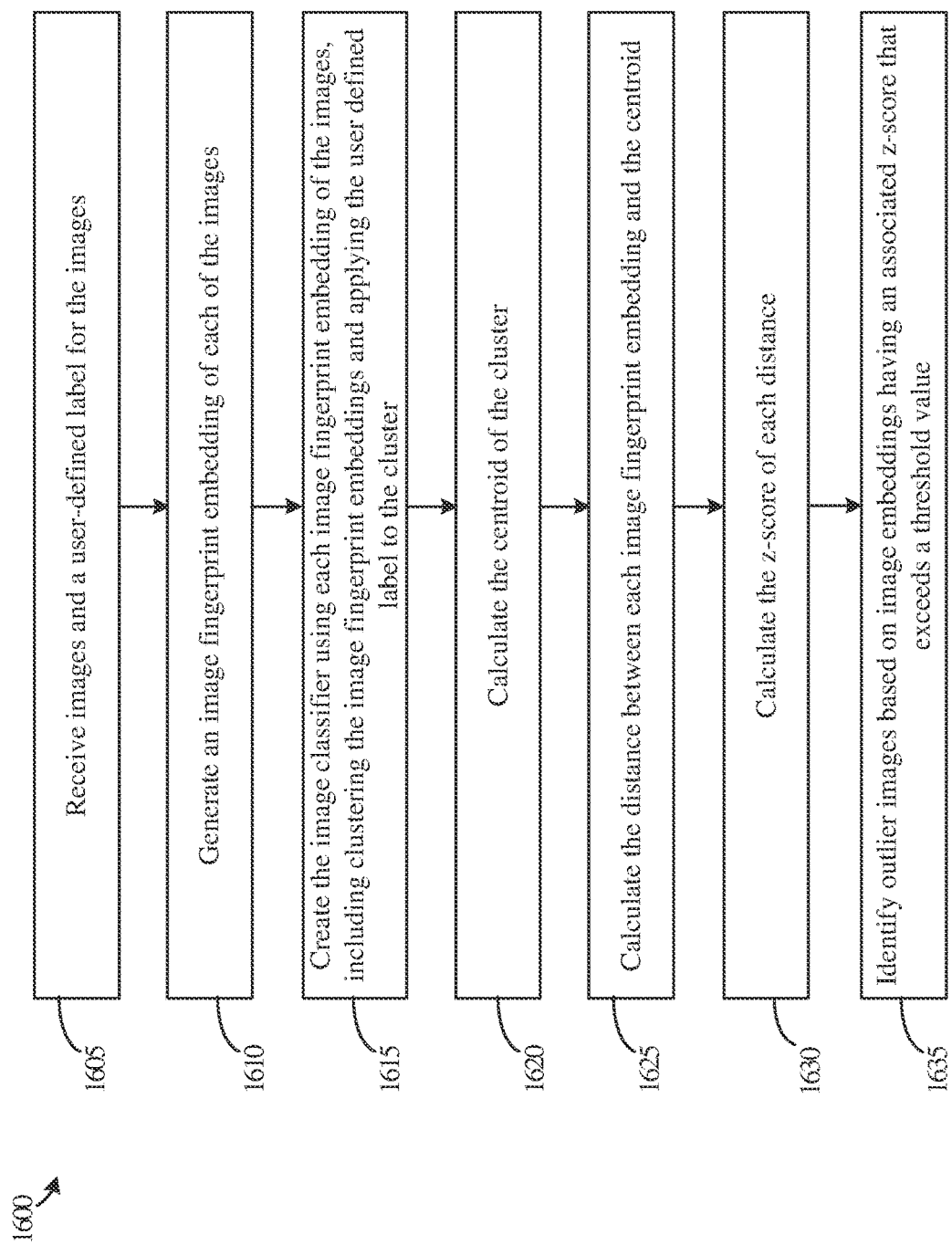
FIG. 16 illustrates a method of identifying image outliers from a set of images, according to some embodiments.

FIG. 16 illustrates a method 1600 for detecting outlier images in a training image dataset. Method 1600 can be used in combination with method 1500, such that similar steps are performed only once (e.g., 1605 and 1505 would be a single step in a combined method). Outliers can be quickly and efficiently identified for a user-defined image classifier and may be used to provide immediate indications to the user identifying the outliers. Method 1600 may be performed by network security system 125. While the steps of method 1600 are depicted in a given order, some steps may be performed multiple times, in a different order, and the like without departing from the scope and spirit of this disclosure.

Method 1600 may begin at step 1605 with receiving images and a user-defined label for the images. For example, the user may use user interface 1300 to provide a set of images representing a class that the user would like to use to train an image classifier for classifying future images. The user may also enter a classifier name used to label images classified into the class by the image classifier.

At step 1610, an image fingerprint embedding is generated for each image. For example, classifier trainer 138 may submit the images to image fingerprinter 130 to generate an image fingerprint (i.e., image embedding) of the image. Each image fingerprint may be a vector representing visual features of the respective image.

At step 1615, the image classifier is created using each image fingerprint embedding of the images. For example, classifier trainer 138 may receive the image embeddings from image fingerprinter 130 and submit the image embeddings to index and ANN model generator 132 to generate the index and associated ANN model for the image classifier. The image fingerprint embeddings used to train the image classifier are grouped into an embedding cluster in the index and the user-defined label is applied to the embedding cluster. When complete the image classifier is trained such that the ANN model retrieves the most similar image embedding from the associated index when provided an image embedding as input. The ANN model obtains the label applied to the image embedding (e.g., based on the embedding cluster to which the most similar image embedding belongs) and provides the label and a score representing a similarity between the most similar image embedding and the input image embedding as output.

At step 1620, the centroid of the embedding cluster is calculated. For example, classifier testing and outlier detector 158 calculates the centroid. The centroid represents the center of the embedding cluster in the embedding space. The embedding space can be represented in a coordinate system, and an abstract representation of an embedding cluster in an embedding space is shown and described with respect to FIG. 18.

At step 1625, the distance between the centroid and each image fingerprint embedding in the embedding cluster is calculated. For example, classifier testing and outlier detector 158 may calculate a Euclidean distance between the centroid and each image fingerprint embedding in the embedding cluster.

At step 1630, the z-score of each distance is calculated. The z-score represents where the distance lies on a normal distribution curve. In other words, the z-score indicates how many stand deviations (i.e., sigma) above or below the average of the distances the particular distance is. For example, classifier testing and outlier detector 158 may calculate the average distance of all the distances, and calculate the z-score for each distance based on the distances and average distance. Any z-score formula that indicates a standard deviation from the normal distribution for each distance can be used.

At step 1635, the outlier images are identified based on image embeddings having a z-score that exceeds a threshold value. For example, classifier testing and outlier detector 158 may compare the z-scores for each image embedding to a threshold value (e.g., 5 standard deviations). Z-scores that fall at or below the threshold value may be determined inliners and z-scores that fall above the threshold value may be determined outliers. The image embeddings associated with the z-scores that are determined outliers are deemed outliers. In some embodiments, images associated with outlier image embeddings may be removed from the training class and the image classifier may be retrained without the outlier image embeddings. In some embodiments, the user may be notified about the outlier images and prompted to indicate whether to remove the images from the image dataset for training the image classifier or not. In some embodiments, the outlier image embeddings are automatically removed.

Figure 17:
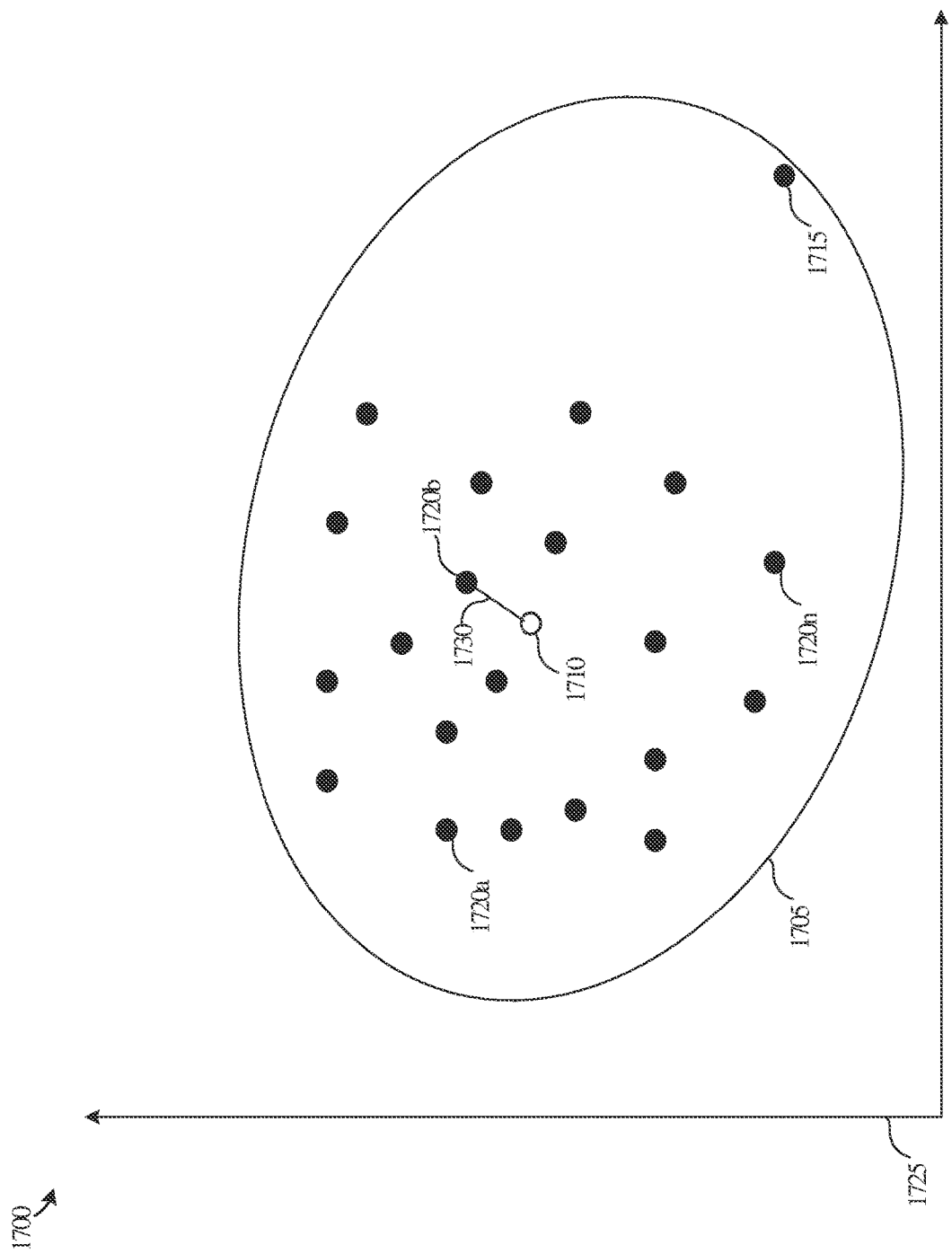
FIG. 17 illustrates an abstract representation of an embedding cluster, according to some embodiments.

FIG. 17 illustrates an abstract representation 1700 of an embedding cluster 1705. The embedding cluster includes data points 1720a, 1720b, 1720n (collectively datapoints 1720), and 1715. The embedding cluster 1705 is plotted in coordinate system 1725 for case of description, though the embedding cluster 1705 may have many additional dimensions not shown. The data points 1720 include data point 1720a, 1720b, and 1720n, though all unnumbered data points in embedding cluster 1705 are collectively included in data points 1720, but every data point is not individually numbered for ease of description. The data points 1720 and data point 1715 each represents an image embedding representing an image uploaded by a user for training an image classifier. Data point 1715 is an outlier, which is shown visually for case of understanding. The remaining data points 1720 are closely grouped, but data point 1715 is further away in the embedding space from other data points 1720 as represented in the abstract representation 1700. To identify this outlier data point 1715, classifier testing and outlier detector 158 can calculate the centroid 1710 of the embedding cluster 1705. Classifier testing and outlier detector 158 can calculate the distance (e.g., distance 1730) between each data point (e.g., data point 1720b) and the centroid 1710. Classifier testing and outlier detector 158 can calculate the z-score based on the distances to represent how far from a normal distribution each image embedding (e.g., data point) lies. Data point 1715 will have a large z-score, which likely exceeds a threshold value. When the z-score associated with a data point (e.g., data point 1715) exceeds the threshold value, the associated image embedding is identified as an outlier.

Figure 18:
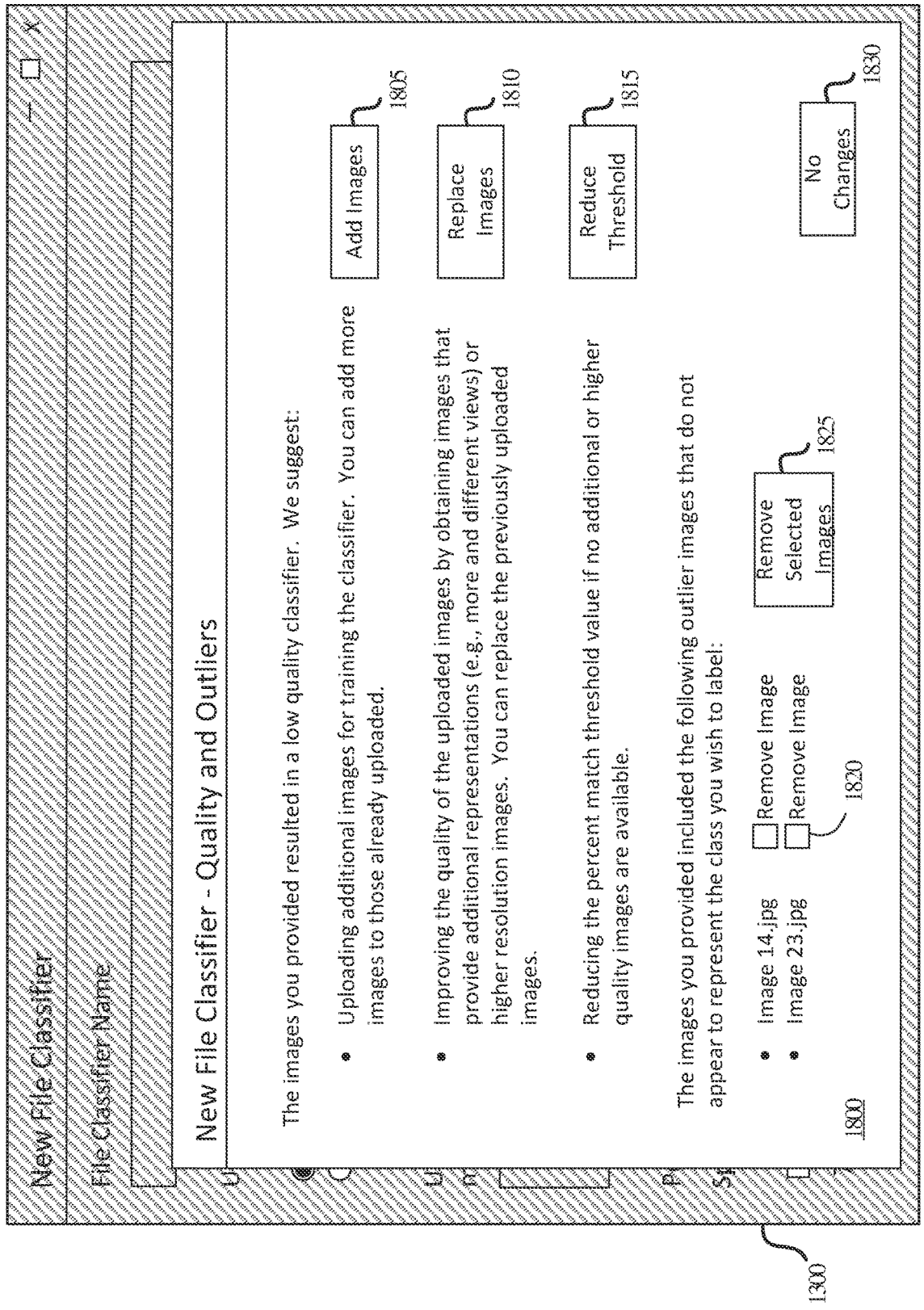
FIG. 18 illustrates an example graphical user interface providing quality and outlier information, according to some embodiments.

FIG. 18 illustrates an example user interface pop-up window 1800 indicating results of the image classifier testing and outlier detection performed by classifier testing and outlier detector 158. User interface pop-up window 1800 may overlay user interface 1300 described with respect to FIG. 13. In the example provided, user interface pop-up window 1800 includes an indication that the images provided for the image classifier resulted in a low quality classifier. User interface pop-up window 1800 may also provide an indication of a high quality or good quality classifier that may not provide the suggestions shown in FIG. 18.

Due to the images resulting in a low quality classifier, user interface pop-up window 1800 may include suggestions to improve the user-defined image classifier. For example, a suggestion to upload additional images for training the classifier is suggested. An add images button 1805 may be included. Clicking the add images button 1805 may change the user interface to provide the user the option to drag and drop additional images to include in the training dataset without uploading the original images again. A suggestion to improve the quality of the uploaded images can be provided in some embodiments. Improving the quality of the images may include obtaining higher resolution images or different images showing the particular class item more clearly. For example, an image of a moving car may be less clear than an image of a non-moving car, so the non-moving car image may be a higher quality image of the same class (e.g., "car"). The suggestion to improve the quality of the images may include replace images button 1810 which may provide the user with an interface to upload images that will replace the images previously uploaded. Another example of a suggestion to improve the quality of the image classifier may include a suggestion reduce the threshold value used to classify the image with the returned label. For example, slider 1325 allows the user to set the comparison threshold value as discussed with respect to FIG. 13. The suggestion may include reduce threshold button 1815. Clicking reduce threshold button 1815 may automatically reduce the threshold value by a preset amount or may provide the user with slider 1325 to adjust.

In addition to the quality information, user interface pop-up window 1800 may include outlier information. When one or more image embeddings are deemed outliers in the training dataset as discussed herein, the associated image name, for example, may be associated and provided to the user along with a checkbox 1820 to select the image for removal. The selection of checkbox 1820 may be implemented by clicking remove selected images button 1825, reduce threshold button 1815, or add images button 1805, for example. Further, an option to keep the image classifier with no changes is provided by clicking no changes button 1830.

The following specific embodiments are contemplated from the above description.

Image Matching Embodiments

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus (i.e., processors), cause the apparatus to perform the actions. One general aspect includes a computer-implemented method. An image fingerprinter may be used to generate image fingerprint embeddings by providing each of the images as input to an image fingerprinting model trained to generate an image fingerprint embedding that is a multi-dimensional feature vector representing visual aspects of the input image. The image fingerprinter may receive each of the image fingerprint embeddings as output from the image fingerprinting model. An index and approximate nearest neighbors model generator may generate an index of the image fingerprint embeddings and an approximate nearest neighbors model associated with the index. An image matcher may analyze a subject image by providing the subject image as input to the image fingerprinting model and receiving a subject image fingerprint embedding as output from the image fingerprinting model. The image matcher may provide the subject image fingerprint embedding as input to the approximate nearest neighbors model trained to retrieve a most similar image fingerprint embedding from the index and generate a score indicating a similarity of the subject image fingerprint embedding to the most similar image fingerprint embedding. Image matcher may analyze the score received from the approximate nearest neighbors model and a security enforcement module may perform a security action based on the score. Other embodiments of this aspect include corresponding computer systems, apparatus, and computer programs recorded on one or more computer storage devices, each configured to perform the actions of the methods.

Implementations may include one or more of the following features. In some embodiments, the score indicates a normalized value of an angular distance between the subject image fingerprint embedding and the most similar image fingerprint embedding. In some embodiments, the image matcher may scan a cloud-based data store for subject images and analyze each of the subject images. In some embodiments, analyzing the score may include comparing the score to a threshold value. In some embodiments, the security action may include ignoring the subject image when the score is below the threshold value, and the security action may include transmitting a security message to an administrator indicating the subject image when the score meets or exceeds the threshold value. In some embodiments, the network security system identifies the subject image based on a user performing an action including the subject image. The action may include uploading the subject image to a cloud application; downloading the subject image from the cloud application; deleting the subject image from the cloud application; sharing the subject image on the cloud application; moving the subject image within the cloud application; and moving the subject image outside the cloud application. In some embodiments, the image matcher may compare the score to a threshold value and the security action may include blocking the action when the score meets or exceeds the threshold value. In some embodiments, the subject image is a transformed copy of the image used to generate the most similar image fingerprint embedding. In some embodiments, the subject image is transformed by cropping the image; rotating the image; distorting color of the image; or blurring the image. In some embodiments, the network security system may provide a graphical user interface including user input elements selectable by a user for providing the images, and the network security system may receive, via the graphical user interface, an indication of the location of the images (e.g., the images may be uploaded to the network security system). Implementations of the described techniques may include hardware, a method or process, or computer software on a computer-accessible medium.

Another general aspect includes a network security system. The network security system includes one or more processor and one or more computer-readable memory devices. The memory devices may include an image fingerprinting model trained to generate an image fingerprint embedding that is a multi-dimensional feature vector representing visual aspects of an input image. The memory devices may further include an image matching component including instructions that, upon execution by the one or more processors, cause the one or more processors to generate image fingerprint embeddings using the image fingerprinting model. The image matching component may also generate an index of the image fingerprint embeddings and an approximate nearest neighbors model associated with the index. The image matching component may further analyze a subject image by providing the subject image as input to the image fingerprinting model and receiving a subject image fingerprint embedding as output from the image fingerprinting model. The image matching component may further provide the subject image fingerprint embedding as input to the approximate nearest neighbors model trained to retrieve a most similar image fingerprint embedding from the index and generate a score indicating a similarity of the subject image fingerprint embedding to the most similar image fingerprint embedding. The image matching component may further analyze the score received from the approximate nearest neighbors model and perform a security action based on the score. Other embodiments of this aspect include corresponding computer systems, apparatus, and computer programs recorded on one or more computer storage devices, each configured to perform the actions of the methods.

Implementations may include one or more of the following features. In some embodiments, the score indicates a normalized value of an angular distance between the subject image fingerprint embedding and the most similar image fingerprint embedding. In some embodiments, a cloud-based storage is scanned for subject images and the image matching component may further analyze each of the subject images. In some embodiments, the score is compared to a threshold value. The security action may include ignoring the subject image when the score is below the threshold value, and the security action may include transmitting a security message to an administrator indicating the subject image when the score meets or exceeds the threshold value. In some embodiments, the network security system includes an image receiving component including instructions that, upon execution by the one or more processors, cause the one or more processors to identify the subject image based on a user performing an action including the subject image. The action may include one of uploading the subject image to a cloud application; downloading the subject image from the cloud application; deleting the subject image from the cloud application; sharing the subject image on the cloud application; moving the subject image within the cloud application; and moving the subject image outside the cloud application. In some embodiments, the score is compared to a threshold value and the security action may include blocking the action when the score meets or exceeds the threshold value. In some embodiments, the subject image is a transformed copy of the image used to generate the most similar image fingerprint embedding. In some embodiments, the subject image is transformed by one or more of cropping the image; rotating the image; distorting color of the image; and blurring the image. In some embodiments, the network security system may include a graphical user interface component used to provide a graphical user interface with user input elements selectable by a user for providing the images. The network security system may receive, via the graphical user interface, an indication of a location of the images. Implementations of the described techniques may include hardware, a method or process, or computer software on a computer-accessible medium.

Image Classifier Training and Image Classification Embodiments

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The method may include generating a first plurality of image fingerprint embeddings, the generating may include providing each of a first plurality of images as input to an image fingerprinting model, where the image fingerprinting model is trained to generate an image fingerprint embedding that is a multi-dimensional feature vector representing visual aspects of the input image, and receiving each of the first plurality of image fingerprint embeddings as output from the image fingerprinting model. The method also includes generating a first index of the first plurality of image fingerprint embeddings and a first approximate nearest neighbors model associated with the first index used to classify subject images, where generating the first index may include clustering subsets of the first plurality of image fingerprint embeddings into embedding clusters. The method also includes applying a label to each of the embedding clusters. The method further includes receiving a second plurality of images selected by a user and a user-defined label for the second plurality of images and generating a second plurality of image fingerprint embeddings using the image fingerprinting model. The method also includes adding the second plurality of image fingerprint embeddings to the first index to generate a second index and a second approximate nearest neighbors model associated with the second index, the adding may include: clustering the second plurality of image fingerprint embeddings into a user embedding cluster, and applying the user-defined label to the user embedding cluster. Other embodiments of this aspect include corresponding computer systems, apparatus, and computer programs recorded on one or more computer storage devices, each configured to perform the actions of the methods.

Implementations may include one or more of the following features. The computer-implemented method where the second plurality of images may include between twenty (20) and one hundred (100) images. The computer-implemented method may include analyzing a subject image, the analyzing may include: providing the subject image as input to the image fingerprinting model; receiving a subject image fingerprint embedding as output from the image fingerprinting model; providing the subject image fingerprint embedding as input to the second approximate nearest neighbors model trained to retrieve a label of a most similar image fingerprint embedding from the second index and generate a score indicating a similarity of the subject image fingerprint embedding to the most similar image fingerprint embedding; analyzing the score received from the second approximate nearest neighbors model; and labeling the subject image based on the score. In some embodiments, the computer-implemented method may include: applying a security policy to the subject image based on the label. In some embodiments, analyzing the score may include comparing the score to a threshold value, labeling the subject image may include labeling the subject image with the label of the most similar image fingerprint embedding when the score meets or exceeds the threshold value, and labeling the subject image may include labeling the subject image with a default label when the score is below the threshold value. In some embodiments, the score indicates a normalized value of an angular distance between the subject image fingerprint embedding and the most similar image fingerprint embedding. In some embodiments, the computer-implemented method may include: identifying the subject image based on a user performing an action including the subject image. The action may include one of: uploading the subject image to a cloud application; downloading the subject image from the cloud application; deleting the subject image from the cloud application; sharing the subject image on the cloud application; moving the subject image within the cloud application; and moving the subject image outside the cloud application. In some embodiments, the computer-implemented method may include: generating a plurality of negative image fingerprint embeddings, the generating may include: providing each of a plurality of negative images as input to the image fingerprinting model, and receiving each of the plurality of negative image fingerprint embeddings as output from the image fingerprinting model; and adding the plurality of negative image fingerprint embeddings to one or more of the first index and the second index, the adding may include labeling each negative image fingerprint embedding with a default label. In some embodiments, the computer-implemented method may include: providing a graphical user interface having user input elements selectable by a user for providing the second plurality of images and the user-defined label. In some embodiments, the computer-implemented method may include: receiving a third plurality of images selected by the user and a second user-defined label for the third plurality of images; generating a third plurality of image fingerprint embeddings, the generating may include: providing each of the third plurality of images as input to the image fingerprinting model, and receiving each of the third plurality of image fingerprint embeddings as output from the image fingerprinting model; and adding the third plurality of image fingerprint embeddings to the first index to generate a third index and a third approximate nearest neighbors model associated with the third index, the adding may include: clustering the third plurality of image fingerprint embeddings into a user embedding cluster, and applying the second user-defined label to the user embedding cluster. In some embodiments, the computer-implemented method may include analyzing a subject image, the analyzing may include: providing the subject image as input to the image fingerprinting model; receiving a subject image fingerprint embedding as output from the image fingerprinting model; providing the subject image fingerprint embedding as input to the second approximate nearest neighbors model trained to retrieve a first label of a most similar image fingerprint embedding from the second index and generate a first score indicating a similarity of the subject image fingerprint embedding to the most similar image fingerprint embedding from the second index; providing the subject image fingerprint embedding as input to the third approximate nearest neighbors model trained to retrieve a second label of a most similar image fingerprint embedding from the third index and generate a second score indicating a similarity of the image subject fingerprint embedding to the most similar image fingerprint embedding from the third index; analyzing the first score and the second score; and labeling the subject image based on the first score and the second score. In some embodiments, the computer-implemented method may include: based on a determination that the first score is higher than the second score, labeling the subject image with the first label. In some embodiments, the computer-implemented method may include: based on a determination that the first score and the second score each meet or exceed a threshold value, labeling the subject image with the first label and the second label. In some embodiments, the computer-implemented method may include: based on a determination that the first score and the second score are below a threshold value, labeling the subject image with a default label. Implementations of the described techniques may include hardware, a method or process, or computer software on a computer-accessible medium. Other aspects may include a network security system implementing the computer-implemented method.

Image Embedding Conversion and Embedding Converter Training Embodiments

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including generating a plurality of first image fingerprint embeddings, the generating may include: providing each of a plurality of images as input to a first image fingerprinting model, where the first image fingerprinting model is trained to generate a first image fingerprint embedding that is a multi-dimensional feature vector representing visual aspects of the input image, and receiving each of the plurality of first image fingerprint embeddings as output from the first image fingerprinting model. The method also includes generating a plurality of second image fingerprint embeddings, the generating may include: providing each of the plurality of images as input to a second image fingerprinting model, where the second image fingerprinting model is trained to generate a second image fingerprint embedding that is a multi-dimensional feature vector representing visual aspects of the input image, and receiving each of the plurality of second image fingerprint embeddings as output from the second image fingerprinting model, where the first image fingerprint embedding is different than the second image fingerprint embedding generated for each of the plurality of images. The method also includes training a converter model to convert a first image fingerprint embedding to a second image fingerprint embedding compatible with other second image fingerprint embeddings, the training may include: for each image of the plurality of images: providing the first image fingerprint embedding associated with the respective image as input to the converter model, receiving an output image fingerprint embedding from the converter model, comparing the output image fingerprint embedding with the second image fingerprint embedding associated with the respective image to calculate a loss, and backpropagating the loss through the converter model. Other embodiments of this aspect include corresponding computer systems, apparatus, and computer programs recorded on one or more computer storage devices, each configured to perform the actions of the methods.

Implementations may include one or more of the following features. In some embodiments, the converter model is an autoencoder. In some embodiments, the comparing uses mean square error to calculate the loss. In some embodiments, the first image fingerprinting model is a first version of an image fingerprinting model, and the second image fingerprinting model is a second version of the image fingerprinting model. In some embodiments, a conversion second image fingerprint embedding generated by the converter model and an original second image fingerprint embedding generated by the second image fingerprinting model are not identical but are exchangeable. In some embodiments, the plurality of images may include images that were not used to train the first image fingerprinting model or the second image fingerprinting model. In some embodiments, the method further includes accessing a plurality of stored first image fingerprint embeddings, providing each of the stored first image fingerprint embeddings as input to the converter model to generate a second plurality of second image fingerprint embeddings, and adding the second plurality of second image fingerprint embeddings to an index including a third plurality of second image fingerprint embeddings generated by the second image fingerprinting model, where the index is used by an approximate nearest neighbors model. In some embodiments, the computer-implemented method may include analyzing a subject image, the analyzing may include: providing the subject image as input to the second image fingerprinting model; receiving a subject image fingerprint embedding as output from the second image fingerprinting model; providing the subject image fingerprint embedding as input to the approximate nearest neighbors model trained to retrieve a most similar image fingerprint embedding from the index and generate a score indicating a similarity of the subject image fingerprint embedding to the most similar image fingerprint embedding; analyzing the score received from the approximate nearest neighbors model; and performing a security action based on the score. In some embodiments, the computer-implemented method may include: clustering subsets of the second image fingerprint embeddings in the index into embedding clusters; and applying a label to each of the embedding clusters. In some embodiments, the computer-implemented method may include analyzing a subject image, the analyzing may include: providing the subject image as input to the second image fingerprinting model; receiving a subject image fingerprint embedding as output from the second image fingerprinting model; providing the subject image fingerprint embedding as input to the approximate nearest neighbors model trained to retrieve a label of a most similar second image fingerprint embedding from the index and generate a score indicating a similarity of the subject image fingerprint embedding to the most similar second image fingerprint embedding; analyzing the score received from the approximate nearest neighbors model; and labeling the subject image based on the score. Implementations of the described techniques may include hardware, a method or process, or computer software on a computer-accessible medium. Other aspects may include a network security system implementing the computer-implemented method.

The aforementioned discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

What is claimed is:

1. A computer-implemented method of determining a quality an image classifier, the method comprising:
   receiving a plurality of images provided by a user and a user-defined label for the plurality of images;
   generating, with an image fingerprint model, a plurality of image fingerprint embeddings, wherein each image fingerprint embedding of the plurality of image fingerprint embeddings represents an associated image of the plurality of images;
   creating the image classifier using each image fingerprint embedding in the plurality of image fingerprint embeddings and a plurality of negative image fingerprint embeddings;
   creating a plurality of test classifiers, wherein the creating comprises creating one test classifier of the plurality of test classifiers for each image fingerprint embedding in the plurality of image fingerprint embeddings, wherein creating each test classifier of the plurality of test classifiers comprises:
      selecting an image fingerprint embedding of the plurality of image fingerprint embeddings as a test embedding for which to create the respective test classifier, and
      creating the respective test classifier using the plurality of negative image fingerprint embeddings and each of the plurality of image fingerprint embeddings except the selected image fingerprint embedding;
   applying each of the plurality of test classifiers to its respective test embedding to obtain a plurality of recall results; and
   assessing the quality of the image classifier based on the plurality of recall results.

2. The computer-implemented method of claim 1, wherein the creating the respective test classifier for a respective image fingerprint embedding comprises:
   generating an index and an approximate nearest neighbor model associated with the index using the plurality of negative image fingerprint embeddings and each of the plurality of image fingerprint embeddings except the respective image fingerprint embedding;
   clustering the plurality of image fingerprint embeddings in the index into a user embedding cluster; and
   applying the user-defined label to the user embedding cluster.

3. The computer-implemented method of claim 2, wherein the applying each of the plurality of test classifiers to its respective test embedding comprises:
   providing the respective test embedding as input to the respective approximate nearest neighbor model trained to retrieve a label of a most similar image fingerprint embedding from the associated index and generate a score indicating a similarity of the associated image fingerprint embedding to the most similar image fingerprint embedding; and
   receiving, from the respective approximate nearest neighbor model in response to the input, the label and the score.

4. The computer-implemented method of claim 3, wherein the applying each of the plurality of test classifiers to its respective test embedding further comprises:
   providing a second plurality of negative image fingerprint embeddings as input to the respective approximate nearest neighbor model; and
   receiving, from the respective approximate nearest neighbor model in response to the input, the label and the score for each of the second plurality of negative image fingerprint embeddings.

5. The computer-implemented method of claim 2, wherein the creating the respective test classifier for a respective image fingerprint embedding further comprises:
   clustering the plurality of negative image fingerprint embeddings into a negative embedding cluster; and
   applying a negative label to the negative embedding cluster.

6. The computer-implemented method of claim 1, wherein the assessing the quality of the image classifier comprises:
   for each test classifier of the plurality of test classifiers, after applying the test classifier to its respective test embedding, calculating a recall value of the respective test classifier; and
   generating an average recall value using recall values generated based on each of the plurality of test classifiers.

7. The computer-implemented method of claim 6, wherein the assessing the quality of the image classifier further comprises:
   in response to determining the average recall value falls below a threshold quality value, transmitting a notification to the user providing an indication of the quality of the image classifier.

8. The computer-implemented method of claim 7, wherein the notification further comprises one of:
   a suggestion to provide additional images that can be classified with the user-defined label;
   a suggestion to provide higher quality images associated with the user-defined label;
   a suggestion to reduce a threshold value used to determine whether subject images are classified with the user-defined label; or
   a combination thereof.

9. The computer-implemented method of claim 1, wherein the creating the image classifier comprises:
   generating an index and an approximate nearest neighbor model associated with the index using the plurality of image fingerprint embeddings;

clustering the plurality of image fingerprint embeddings into a user embedding cluster; and
applying the user-defined label to the user embedding cluster.

10. The computer-implemented method of claim 9, wherein the creating the image classifier further comprises:
clustering the plurality of negative image fingerprint embeddings into a negative embedding cluster; and
applying a negative label to the negative embedding cluster.

11. The computer-implemented method of claim 9, further comprising:
identifying outliers of the plurality of the images, the identifying the outliers comprising:
calculating a centroid of the user embedding cluster; and
for each image fingerprint embedding of the plurality of image fingerprint embeddings:
calculating a distance between the respective image fingerprint embedding and the centroid,
calculating a z-score of the distance for the respective image fingerprint embedding, and
based on a comparison of the z-score to a threshold score:
identifying the respective image fingerprint embedding as an outlier when the z-score meets or exceeds the threshold score; and
identifying the respective image fingerprint embedding as an inlier when the z-score is below the threshold score.

12. The computer-implemented method of claim 11, further comprising:
based on identifying the outliers, transmitting a notification to the user indicating images of the plurality of images associated with the image fingerprint embeddings that are identified as the outliers.

13. The computer-implemented method of claim 11, further comprising:
recreating the image classifier using the plurality of image fingerprint embeddings after removing image fingerprint embeddings that are identified as the outliers from the plurality of image fingerprint embeddings.

14. The computer-implemented method of claim 1, wherein the image fingerprint model is trained to generate an image fingerprint embedding comprising a multi-dimensional feature vector representing visual aspects of the associated image input to the image fingerprint model.

15. A system for determining a quality of an image classifier, the system comprising:
one or more processors; and
one or more memories having stored thereon instructions that, upon execution by the one or more processors, cause the one or more processors to:
receive, via a user interface, a plurality of images provided by a user and a user-defined label for the plurality of images;
generate, with an image fingerprint model of the system, a plurality of image fingerprint embeddings, wherein each image fingerprint embedding of the plurality of image fingerprint embeddings represents an associated image of the plurality of images;
create the image classifier using each image fingerprint embedding in the plurality of image fingerprint embeddings and a plurality of negative image fingerprint embeddings;
create a plurality of test classifiers comprising one test classifier of the plurality of test classifiers for each image fingerprint embedding in the plurality of image fingerprint embeddings, wherein the instructions to create each test classifier of the plurality of test classifiers comprises instructions that further cause the one or more processors to:
select an image fingerprint embedding of the plurality of image fingerprint embeddings as a test embedding for which to create the respective test classifier, and
create the respective test classifier using the plurality of negative image fingerprint embeddings and each of the plurality of image fingerprint embeddings except the selected image fingerprint embedding;
apply each of the plurality of test classifiers to its respective test embedding to obtain a plurality of recall results; and
assess the quality of the image classifier based on the recall results.

16. The system of claim 15, wherein:
the instructions to create the respective test classifier for a respective image fingerprint embedding comprise further instructions that, upon execution by the one or more processors, cause the one or more processors to:
generate an index and an approximate nearest neighbor model associated with the index using the plurality of negative image fingerprint embeddings and each of the plurality of image fingerprint embeddings except the respective image fingerprint embedding,
cluster the plurality of image fingerprint embeddings in the index into a user embedding cluster, and
apply the user-defined label to the user embedding cluster; and
the instructions to apply each of the plurality of test classifiers to its respective test embedding comprise further instructions that, upon execution by the one or more processors cause the one or more processors to:
provide the respective test embedding as input to the respective approximate nearest neighbor model trained to retrieve a label of a most similar image fingerprint embedding from the associated index and generate a score indicating a similarity of the associated image fingerprint embedding to the most similar image fingerprint embedding, and
receive, from the respective approximate nearest neighbor model in response to the input, the label and the score.

17. The system of claim 15, wherein the instructions to assess the quality of the image classifier comprise further instructions that, upon execution by the one or more processors, cause the one or more processors to:
for each test classifier of the plurality of test classifiers, after applying the test classifier to its respective test embedding, calculate a recall value of the respective test classifier;
generate an average recall value using recall values generated based on each of the plurality of test classifiers; and
in response to determining the average recall value falls below a threshold value, transmitting a notification to the user providing an indication of the quality of the image classifier, wherein the notification further comprises one of:
a suggestion to provide additional images that can be classified with the user-defined label;
a suggestion to provide higher quality images associated with the user-defined label;

a suggestion to reduce a threshold value used to determine whether subject images are classified with the user-defined label; or a combination thereof.

18. The system of claim 15, wherein the instructions to create the image classifier comprise further instructions that, upon execution by the one or more processors, cause the one or more processors to:

generate an index and an approximate nearest neighbor model associated with the index using the plurality of image fingerprint embeddings;

cluster the plurality of image fingerprint embeddings into a user embedding cluster; and apply the user-defined label to the user embedding cluster.

19. The system of claim 18, wherein the instructions comprise further instructions that, upon execution by the one or more processors, cause the one or more processors to:

identify outliers of the plurality of the images, the instructions to identify the outliers comprising further instructions that, upon execution by the one or more processors, cause the one or more processors to:

calculate a centroid of the user embedding cluster, and for each image fingerprint embedding of the plurality of image fingerprint embeddings:

calculate a distance between the respective image fingerprint embedding and the centroid;

calculate a z-score of the distance for the respective image fingerprint embedding; and based on a comparison of the z-score to a threshold score:

identify the respective image fingerprint embedding as an outlier when the z-score meets or exceeds the threshold score, and identify the respective image fingerprint embedding as an inlier when the z-score is below the threshold score; and based on identifying the outliers, perform one of:

transmit a notification to the user indicating images of the plurality of images associated with the image fingerprint embeddings that are identified as the outliers, recreate the image classifier using the plurality of image fingerprint embeddings after removing image fingerprint embeddings that are identified as the outliers from the plurality of image fingerprint embeddings, or a combination thereof.

20. The system of claim 18, wherein the instructions to create the image classifier further comprise instructions that, upon execution by the one or more processors, cause the one or more processors to:

cluster the plurality of negative image fingerprint embeddings into a negative embedding cluster; and apply a negative label to the negative embedding cluster.

* * * * *